United States Patent [19]

Nishio et al.

[11] Patent Number: 5,669,048
[45] Date of Patent: Sep. 16, 1997

[54] EXPOSURE DEVICE HAVING A MOVABLE LIGHT-ATTENUATING FILTER FOR CONTROLLING AN AMOUNT OF EXPOSURE LIGHT AND EXPOSURE METHOD THEREOF

[75] Inventors: Tomonori Nishio; Kanji Nagashima, both of Kanagawa, Japan

[73] Assignee: Fuji Photo Film Co., Ltd., Kanagawa, Japan

[21] Appl. No.: 569,288

[22] Filed: Dec. 8, 1995

[30] Foreign Application Priority Data

Dec. 12, 1994 [JP] Japan .................................. 6-307838
Dec. 14, 1994 [JP] Japan .................................. 6-310889

[51] Int. Cl.⁶ .......................... G03G 15/04; G03G 15/28; G03G 15/30
[52] U.S. Cl. .................... 399/206; 355/67; 399/51; 399/177
[58] Field of Search .................... 355/210, 228, 355/229, 326 R, 327, 208, 233, 234, 235, 243, 67, 68, 69, 71, 77; 399/38, 39, 130, 151, 177, 178, 206, 207, 209, 211, 215, 216, 51

[56] References Cited

U.S. PATENT DOCUMENTS

| | | |
|---|---|---|
| 4,610,538 | 9/1986 | Takenaka .................................. 355/69 |
| 5,321,487 | 6/1994 | Shiba et al. ............................. 355/327 |
| 5,430,523 | 7/1995 | Tanibata ................................. 355/71 X |
| 5,438,389 | 8/1995 | Kito et al. .............................. 355/71 X |
| 5,510,880 | 4/1996 | Song ..................................... 355/228 |

*Primary Examiner*—Sandra L. Brase
*Attorney, Agent, or Firm*—Sughrue, Mion, Zinn, Macpeak, and Seas

[57] ABSTRACT

An exposure device which scans and exposes a photosensitive material at low cost and with an appropriate amount of light. In a state in which the original is moved, light adjusted by a light-adjusting filter is transmitted through a light-attenuating filter and then is illuminated onto the original. The light-attenuating filter has regions 54A1, 54A2, 54A3, ... having a fixed transmittance and a region 54B having the same transmittance of the regions 54A1, 54A2, 54A3, ... The light-attenuating filter is moved and a transmission region on the regions 54A1, 54A2, 54A3, ... of light illuminated onto the original is adjusted, so that an amount of light illuminated onto the original becomes an amount of light corresponding to exposure conditions. When the amount of light corresponding to the exposure conditions is the minimum amount of light, the light-attenuating filter is moved so that light illuminated onto the original is transmitted through the region 54B. Light transmitted through the moving original is transmitted through a slit to form slit light, and the slit light is imaged onto the photosensitive material by a zoom lens.

32 Claims, 19 Drawing Sheets

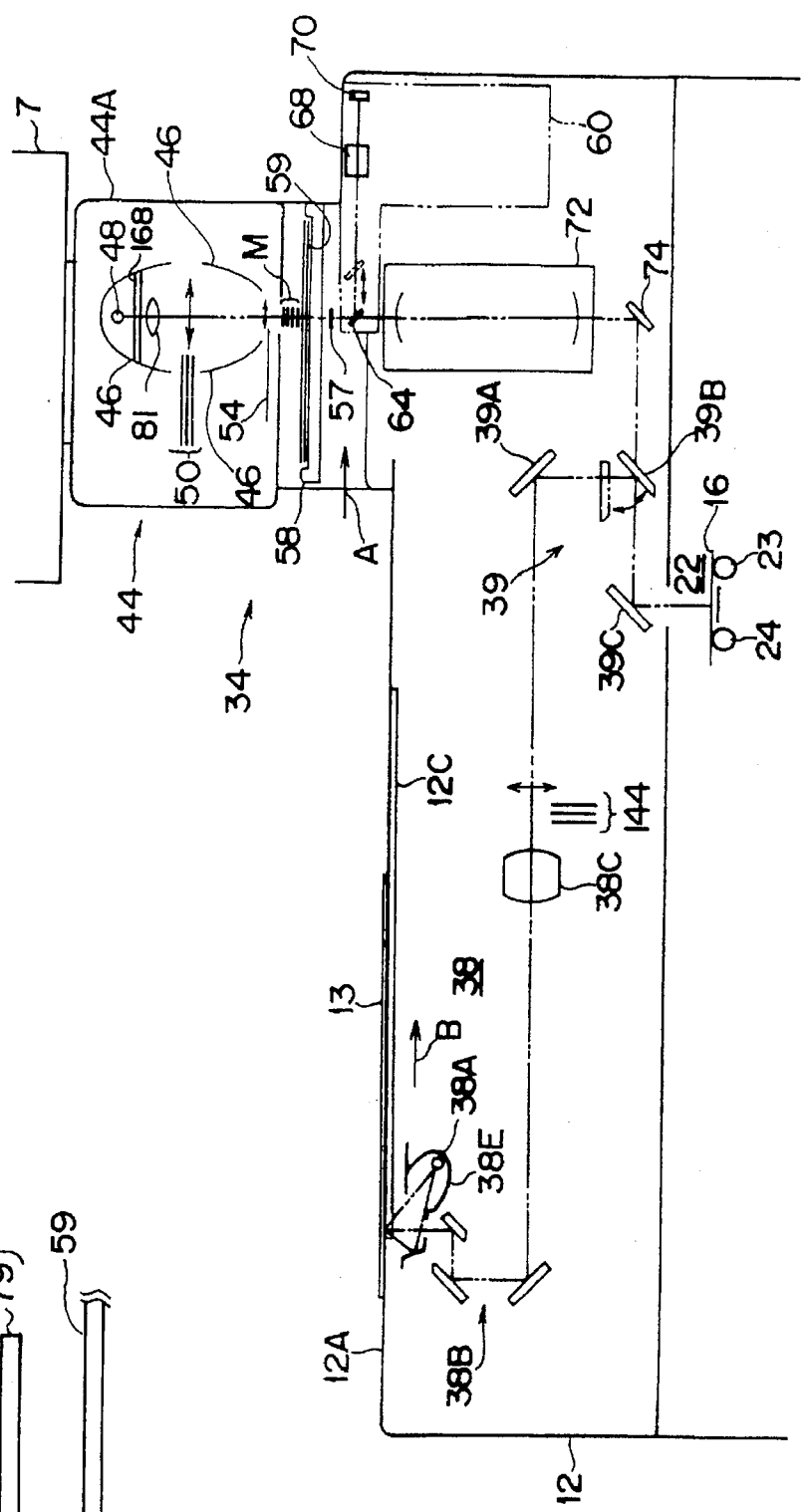
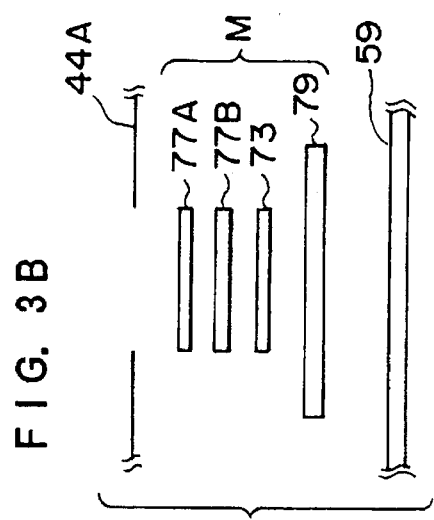
FIG. 3A
FIG. 3B

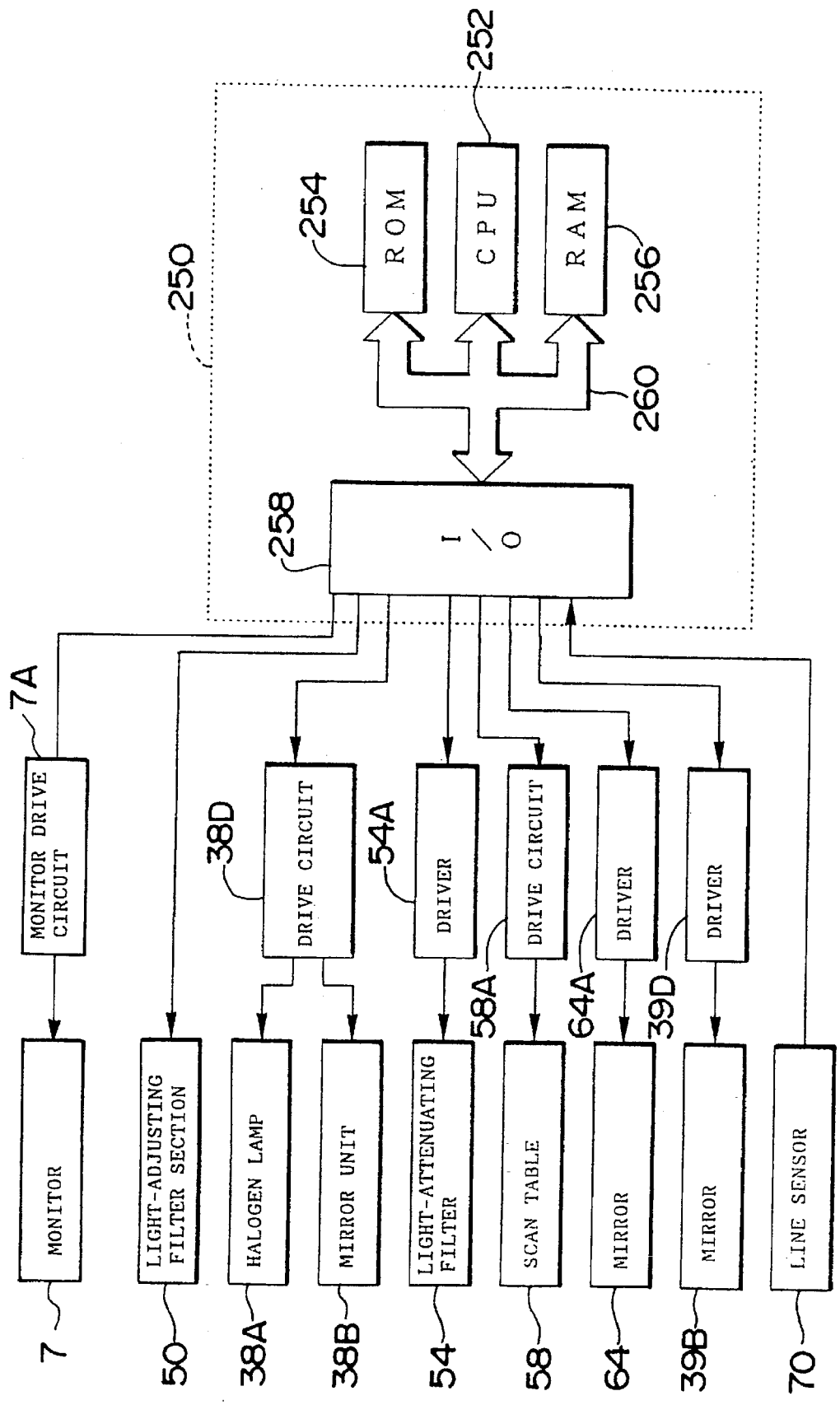

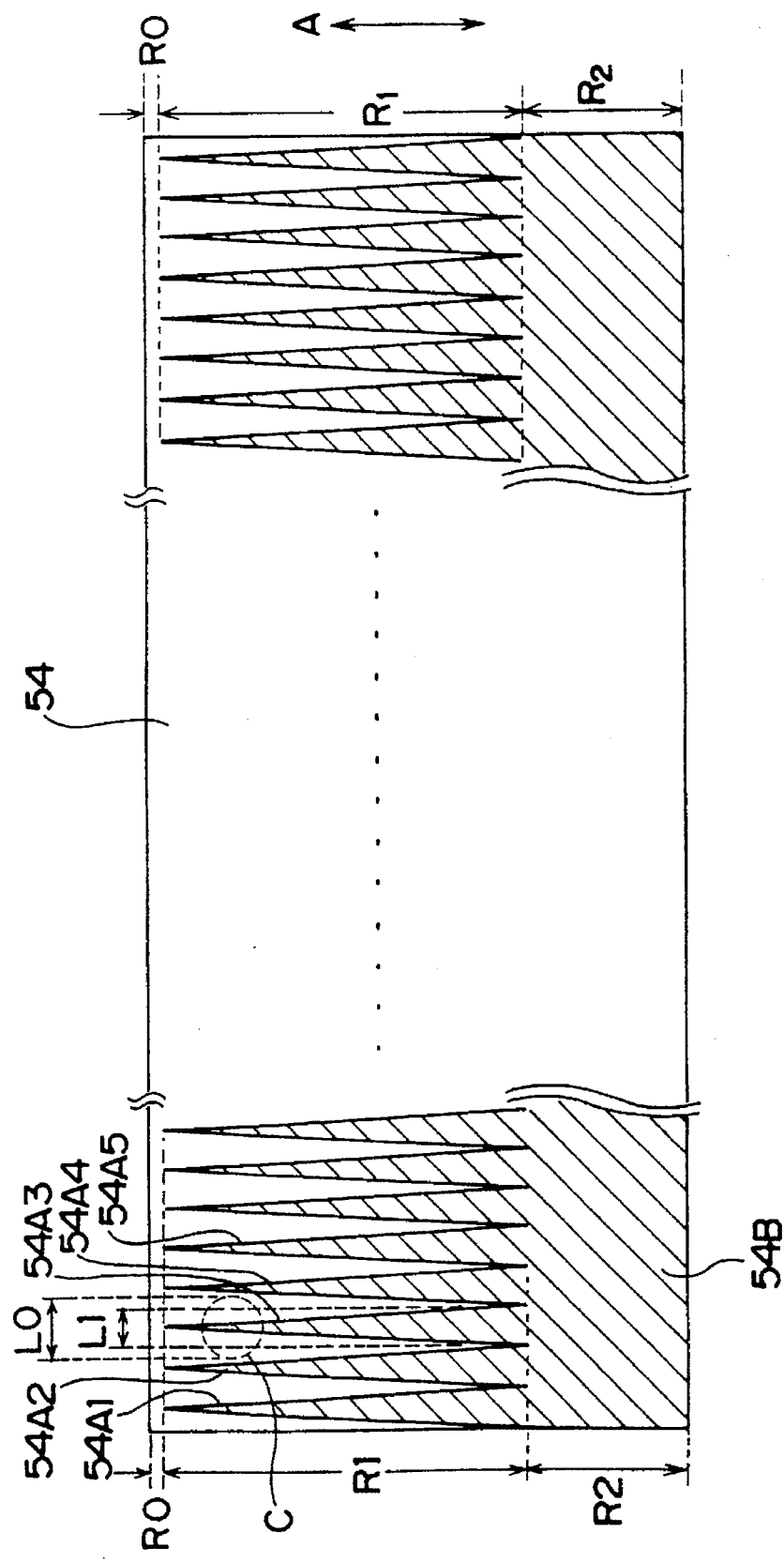

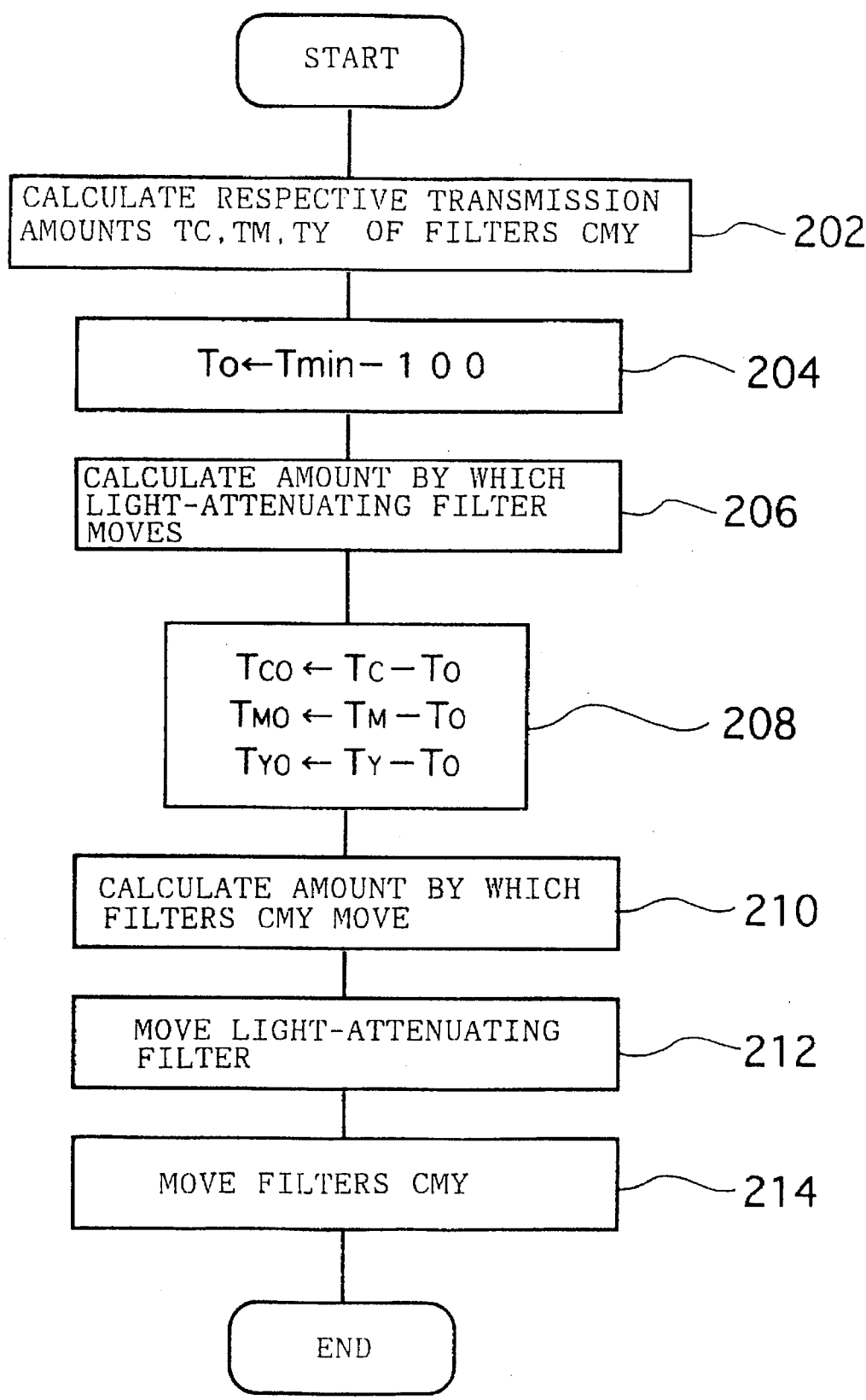

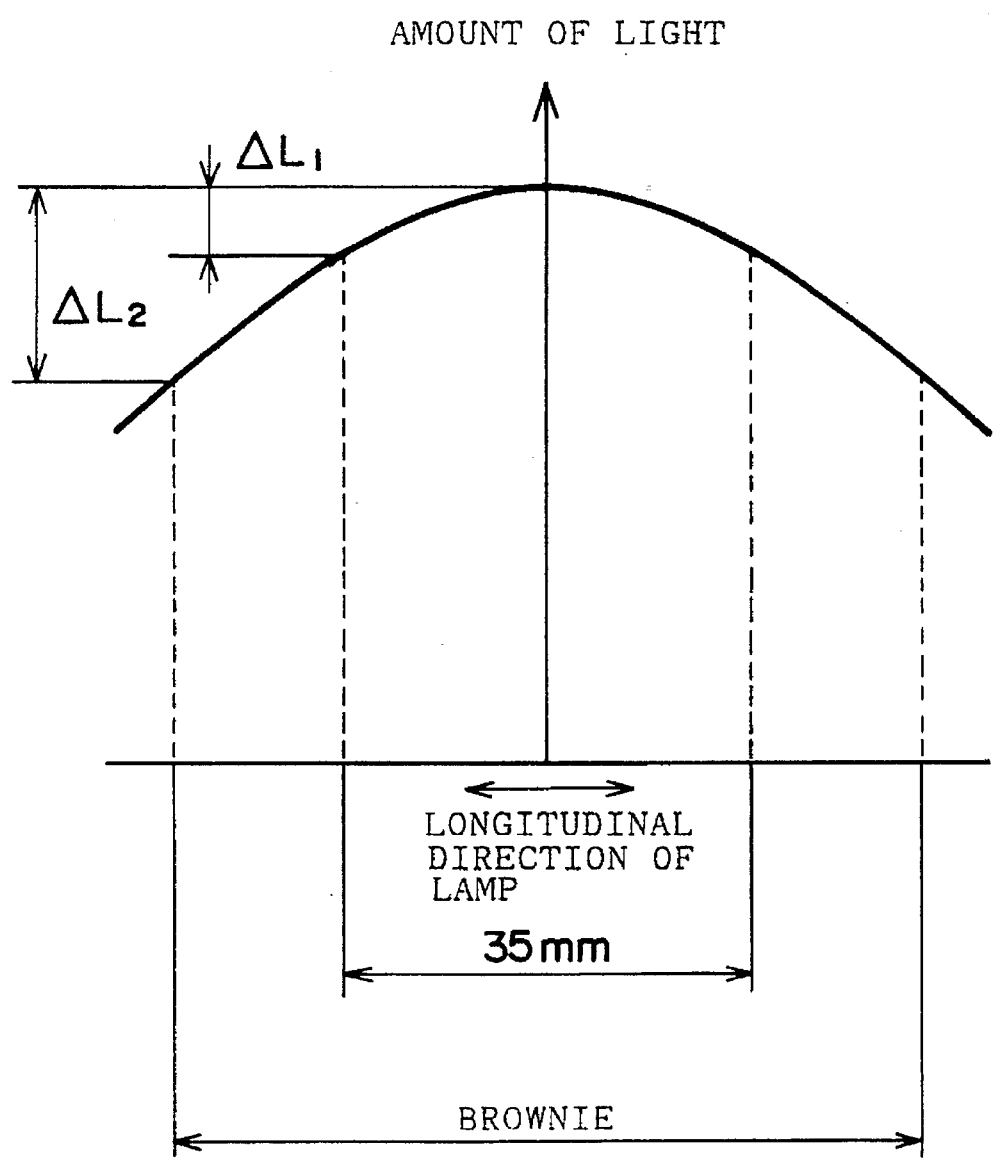

EXPOSURE DEVICE HAVING A MOVABLE LIGHT-ATTENUATING FILTER FOR CONTROLLING AN AMOUNT OF EXPOSURE LIGHT AND EXPOSURE METHOD THEREOF

BACKGROUND OF THE INVENTION

1. Field of the Invention

The present invention relates to an exposure device used by an image recording device or an image reading device, and to an exposure method of the exposure device. More particularly, the present invention relates to an exposure device used by an image recording device or an image reading device, in which a light-receiving element is exposed with at least one of light scanning an original and transmitted through the original and light scanning the original and reflected at the original, and to an exposure method of the exposure device.

2. Description of the Related Art

Conventionally, in an image recording device such as a copying machine and a printer, or an image reading device such as a scanner, generally, a reflection original such as printed matter and photograph is mainly used as an original image. However, with the diversification of image information recording in recent years, an image recording device or an image reading device is put to practical use, in which, as well as the reflection original such as printed matter, a transmission original such as slide, proof, microfilm, negative film or the like can be used as the original image.

In an image recording (reading) device in which the reflection original such as printed matter is used, the original image is recorded in such a manner that light emitted from a light source is illuminated onto the reflection original and the reflected light reflected at the original and carrying an original image is imaged and exposed onto a recording material such as a photosensitive material, or the original image is read in such a manner that the reflected light is imaged onto a line sensor such as a CCD and is read photoelectrically.

On the other hand, in an image recording (reading) device in which the transmission original such as a negative film is used image recording is effected in such a manner that light emitted from the light source is made incident on the transmission original and the transmitted light transmitted through the original and carrying the original image is imaged and exposed onto the photosensitive material, or image reading is effected in such a manner that the transmitted light is imaged onto a CCD or the like.

In these devices, from the standpoint that an exposure optical system is made smaller or that a large-sized light source having a large amount of light is not required, a slit scanning/exposure device is often used in which a rod-shaped light source and a slit extending in the same direction as the light source are used to slit-scan an original in a direction perpendicular to the longitudinal direction of the slit and an image-receiving element such as a recording material and a CCD sensor is exposed with slit-shaped transmitted light or reflected light. A more detailed description of such a device is given as follows. Namely, the device is provided with a lamp unit comprising a rod-shaped light source, a light-adjusting filter for adjusting light from the light source in accordance with the color of an image recorded on an original, and a reflector which gathers light from the light source and light adjusted by the light-adjusting filter and irradiating the gathered light onto the original. As the lamp unit and a film original are moved relative to each other, the film original is scanned with light gathered by the reflector. Then, light transmitted through the film original is used as slit light to effect image recording or image reading.

However, when slit light scanned on the film original and transmitted through and/or reflected at the film original is scanned and exposed onto, for example, an intermediate transfer medium or the like, a large amount of light is illuminated onto the original and this amount of light may possibly be made greater than a proper amount of exposure required when an image recorded on the original is exposed onto the recording material. Accordingly, there is a possibility that, since the intermediate transfer medium or the like cannot be scanned and exposed with a proper amount of exposure, a proper image may not be obtained.

In view of the above-described circumstances, exposure processing of a recording material or the like has been conventionally effected in such a manner that, for example, two shading plates are disposed between the light-adjusting filter and the original and advances onto and withdraws from the optical axis of the light source so that an irradiation range of the slit light illuminated onto the recording material, CCD or the like becomes narrower. In this case, when the shading plates advance onto the optical axis, the irradiation range of the slit light is adapted to become narrower along the longitudinal direction of the irradiation range thereof. For this reason, the rate of change at which the irradiation range of the slit light illuminated onto the recording material or the like decreases with respect to a unit amount by which the shading plates move, is large. Accordingly, in order to expose the recording material or the like with a proper amount of light, it is necessary to precisely control movement of the shading plates. However, even if, for example, the shading plates are moved by a high-division pulse motor or the like, it is difficult to effect precise movement of the shading plates enough such that the recording material or the like can be exposed with a proper amount of light. As a result, there is a drawback with the conventional system in that, since it is not possible to expose the recording material or the like with the proper amount of light, optimal image recording or reading cannot be performed.

Meanwhile, there is considered another exposure processing of the recording material or the like with the proper amount of light, which is constructed in that, in place of the above-described shading plates, a filter is disposed with predetermined derivative or metal (chromium, silver, aluminum or the like) being deposited on a flat plate made of glass such that the amount of transmitted light continuously decreases from one end to the other of the filter and the filter advances onto and withdraws from the optical axis. However, there is a drawback in that the manufacturing cost of this type of filter is high and is not realistic.

Further, in the slit scanning/exposure device, various light sources such as a rod-shaped halogen lamp, a fluorescent light, and the like, are used. However, a light source generally has irregularities in the amount of light, which is so-called shading, in which an amount of light decreases from the center to an exterior of an irradiation position of the light source. In the case of a rod-shaped light source, the amount of light is usually high at a central portion thereof and it is low at each of both end portions. Accordingly, it is not possible to irradiate the original with a uniform amount of light throughout the irradiation region. For this reason, when image recording or image reading is effected by using the rod-shaped light source as it is, uneven density occurs on a recorded or read image in a longitudinal direction of a slit. As a result, correction of the irregularity in the amount of light is needed.

The correction of the irregularity in the amount of light is generally performed in such a manner that a correction filter having a light transmittance distribution opposite to the irregularity in the amount of light is disposed on an optical path and the amount of light decreases at the central portion in the longitudinal direction of the light source. Namely, the correction of the irregularity in the amount of light basically causes a decrease in the amount of light, and therefore, an exposure device in which an original or a photosensitive material, which requires a large amount of light, can be used, needs to improve the amount of light of the light source. For example, when a 35 mm-size negative film or the like is used as the original, negative films photographed by an unspecified large number of general users are often used. For this reason, a photographed condition of each original is not constant, and a large number of overexposed negative films are used as originals. Accordingly, in order to obtain prints on which proper images corresponding to each of negative-film originals in various photographed conditions are formed, a light source having a large amount of light is needed which can obtain an amount of transmitted light enough for exposure of an image-receiving element even when an overexposed and high-density negative film is used.

However, as described above, there is a drawback in that, since correction of the irregularity in the amount of light basically causes loss of the amount of light, a light source whose amount of light is large by the loss amount of light becomes necessary. Further, a general exposure device usually corresponds to various sizes of originals. For example, in an exposure device in which the above-described negative film is used as the original, various sizes of films from 35 mm-size to Brownie size are used. For this reason, it is necessary to use a rod-shaped light source having a length which corresponds to an original of the maximum size. However, the longer the rod-shaped light source becomes, the larger the difference in amount of light between the central portion of the light source and both end portions thereof, i.e., the irregularity in the amount of light, becomes. Accordingly, it is necessary to substantially reduce the amount of light at the central portion of the rod-shaped light source, but there is a drawback in that, when a small-sized original is used, the loss of the amount of light is excessively generated when a small-sized original is used.

SUMMARY OF THE INVENTION

In view of the above-described circumstances, an object of the present invention is to provide an exposure device used by an image recording device or an image reading device, in which an image receiving element can be scanned and exposed at a low cost and with a proper amount of light, and to provide an exposure method of the exposure device.

Further, another object of the present invention is to provide an exposure device which, in addition to the above-described effects, can also properly effect correction of the irregularity in the amount of light, and even when a large amount of light is required, can prevent reduction in the amount of light caused by correction of the irregularity in the amount of light so as to effect exposure processing with an adequate amount of light, and to provide an exposure method of the exposure device.

In accordance with a first aspect of the present invention, there is provided an exposure device used by an image recording device or an image reading device, in which a light-receiving element is exposed with at least one of light scanning an original and transmitted through the original and light scanning the original and reflected at the original, comprising: a light source which illuminates the original; a light-adjusting filter which adjusts light from the light source in accordance with color of an image recorded on the original; illumination means which gathers at least one of light from the light source and light adjusted by the light-adjusting filter and irradiates the gathered light onto the original; moving means which causes at least one of the light source, the light-adjusting filter and the illumination means, and the original to move relatively; a light-attenuating filter which can move in a direction of the relative movement and has a light-attenuating region of a fixed transmittance, which attenuates light illuminated onto the original and of which area gradually increases in the direction of the relative movement; filter moving means which moves the light-attenuating filter such that an amount of light illuminated onto the original becomes a target amount of light; an imaging optical system which causes light from the original to be imaged at the image-receiving element; and a slit which changes light imaged at the image-receiving element by the imaging optical system into slit light, the slit being formed in that a longitudinal direction thereof is disposed in a direction crossing the direction of the relative movement.

In accordance with the first aspect of the present invention, all or a part of light from the light source, which is illuminated onto the original, is transmitted through the light-adjusting filter. The light transmitted through the light-adjusting filter is adjusted in accordance with color of an image recorded on the original. The moving means is used to relatively move a group including the light source, the light-adjusting filter and the illumination means, and the original. Meanwhile, as a method of relatively moving a group including the light source, the light-adjusting filter and the illumination filter, and the original, there are considered three methods: a first method in which the original is moved relative to the light source; the light-adjusting filter and the illumination means; a second method in which the light source, the light-adjusting filter and the illumination means are moved relative to the original; and a third method in which a group including the light source the light-adjusting filter and the illumination means, and the original are both moved.

In a state in which a group including the light source, the light-adjusting filter and the illumination means, and the original are relatively moved in accordance with any one of the first, second and third methods, the illumination means is used to gather and illuminate at least one of light from the light source and light adjusted by the light-adjusting filter, i.e., light from the light source adjusted by the light-adjusting filter, onto the original. The light gathered by the illumination means is transmitted through the light-attenuating filter disposed between the illumination means and the original and then is illuminated onto the original. The light-attenuating filter can move in the direction of the above-described relative movement and has the light-attenuating region of a fixed transmittance, in which the light illuminated onto the original is attenuated and of which area gradually increases in the direction of the relative movement. The filter moving means moves the light-attenuating filter such that the amount of light transmitted through the light-attenuating filter and illuminated onto the original becomes the target amount of light. Thereafter, the light transmitted through the original is transmitted through the slit which extends in the direction intersecting the direction of the relative movement to form the slit light, which, in turn, is imaged onto the image-receiving element by the imaging optical system. As described above, since a group including the light source, the light-adjusting filter and the illumination means, and the original are moved relatively by the moving means, the recording material or the like is scanned and exposed with the slit light. As a result, the image corresponding to the original is recorded/read on the image-receiving element.

The light-attenuating region formed in the light-attenuating filter is gradually made larger in the direction of the relative movement. This makes it possible to lessen the rate of change in the decrement of light illuminated onto the original with respect to the unit amount by which the light-attenuating filter moves and to strictly control the decrement of light illuminated onto the original. As a result, it is possible to illuminate the original with a suitable amount of light and to expose the recording material or the like with a suitable amount of light transmitted through the original. Thus, a proper image can be obtained.

Further, the light-attenuating region formed in the light-attenuating filter has a fixed transmittance. For this reason, as compared with a filter formed in that predetermined derivatives or metal are deposited such that the transmittance gradually increase in the direction of the relative movement, the light-attenuating filter can be manufactured at low cost. Accordingly, the exposure device can also be manufactured at low cost.

In this case, the light-attenuating region of the light-attenuating filter may be formed integrally with the correction of the irregularity in the amount of light in the longitudinal direction of the light source. With this structure, when the amount by which the light-attenuating filter advances onto an optical axis and the amount of exposure is increased, the irregularity in the amount of light is also reduced. Accordingly, when the large amount of light is required, it is possible to prevent reduction in the amount of light due to correction of irregularity in the amount of light, which was not prevented by the conventional device, and to utilize the amount of light emitted from the light source at the maximum. Further, even when the original such as a 35 mm-size negative film is used, which requires the large amount of light for exposure, image exposure processing can be suitably effected.

In accordance with a second aspect of the present invention, there is provided an exposure method of an exposure device, the exposure device comprising: a light source which illuminates the original; a light-adjusting filter which adjusts light From the light source in accordance with color of an image recorded on the original; illumination means which gathers at least one of light from the light source and light adjusted by the light-adjusting filter and irradiates the gathered light onto the original; moving means which causes at least one of the light source, the light-adjusting filter and the illumination means, and the original to move relatively; a light-attenuating filter which can move in a direction of the relative movement and has a light-attenuating region of a fixed transmittance, which attenuates light illuminated onto the original and of which area gradually increases in the direction of the relative movement; filter-moving means which moves the light-attenuating filter such that an amount of light illuminated onto the original becomes a target amount of light; an imaging optical system which causes light from the original to be imaged at the image-receiving element; and a slit which changes light imaged at the image-receiving element by the imaging optical system into slit light, the slit being formed in that a longitudinal direction thereof is disposed in a direction crossing the direction of the relative movement, the method comprising the step of: a moving step for moving the light-adjusting filter and the light-attenuating filter such that an amount of slit light imaged at the image-receiving element becomes a target amount of light in accordance with color of an image recorded on the original.

In accordance with the second aspect of the present invention, the light-adjusting filter and the light-attenuating filter are moved such that the amount of slit light becomes the target amount of light corresponding to the color of an Image recorded on the original. For this reason, it is possible to reduce the amount by which the light-adjusting filter moves and also to scan and expose the image-receiving element with the suitable amount of light.

BRIEF DESCRIPTION OF THE DRAWINGS

FIG. 3A is a schematic structural view of an optical system of the image recording device; and FIG. 3B is an enlarged view of an M section shown in FIG. 3A.

FIG. 5 is a block diagram of a control device.

FIG. 6 is a schematic diagram of a light-attenuating filter according to the first embodiment.

FIG. 9 is a flow chart of a control routine of each movement of a light-adjusting filter and the light-attenuating filter.

FIG. 19 is a diagram for illustrating an example of effects of the light-attenuating filter of the second embodiment.

DESCRIPTION OF THE PREFERRED EMBODIMENTS

First Embodiment

Referring now to the attached drawings, a detailed description will be given of embodiments of the present invention.

Figure 1:
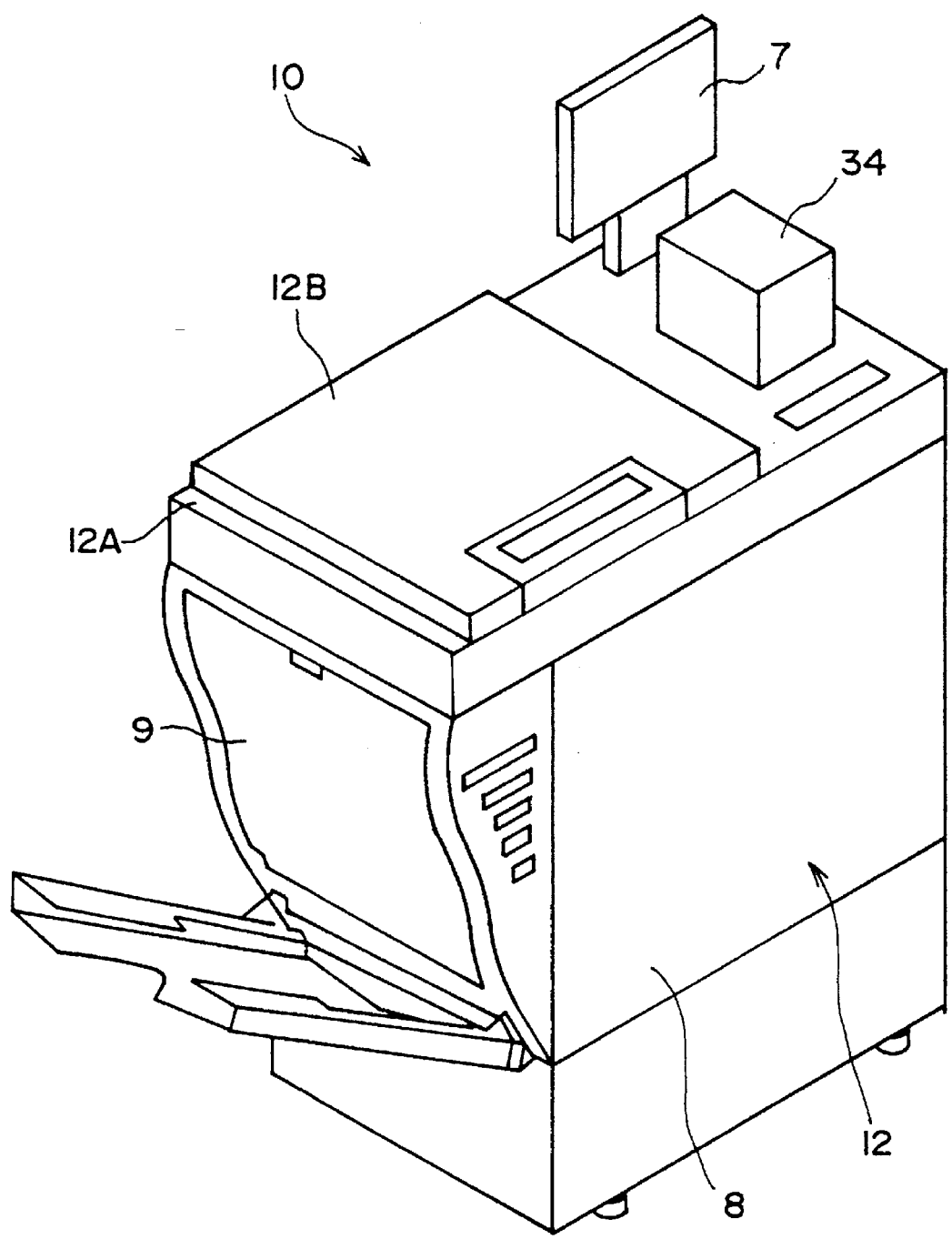
FIG. 1 is a perspective view showing an exterior of an image recording device according to first and second embodiments to which the present invention is applied.

FIG. 1 shows an exterior of an image recording device 10 to which an exposure device according to the present invention is applied. The image recording device 10 needs a heat development process of a photosensitive material, and in the presence of an image-forming solvent such as water, uses the photosensitive material in which an image is transferred to and formed in an image-receiving material having an image-receiving layer. In the image recording device 10, not only a reflection original such as printed matter, photograph or the like, or a transmission positive original such as a slide in 135 magazine, proof or the like, but also a transmission negative original such as a 35 mm-size negative film or the like, can be used as the original, and original images of each of these originals can be recorded on a positive-positive photosensitive material or a negative-positive photosensitive material in accordance with each of the originals.

A machine stand 12 of the image recording device 10 is formed in a box shape on the whole. Front surface door 8 and side surface door 9 are attached to the machine stand 12. By opening these doors, the interior of the machine stand 12 is exposed. Each door is provided with an unillustrated safety device operated by an interlocking mechanism. For this reason, synchronously with the opening of the front surface door 8 or the side surface door 9, a power source at a predetermined position is cut off.

A loading stand 12A on which a paper original is loaded is provided at the top surface of the machine stand 12. A presser cover 12B is removably attached to the loading stand 12A such that it can be opened and closed with the axis of opening and closing being a region at the rear side of the device. Further, a transparent glass plate 12C (see FIG. 3) is mounted on the loading stand 12A. A paper original 13 is placed on the transparent glass plate 12C. The paper original 13 placed on the transparent glass plate 12C is held at a predetermined position by the closing of the presser cover 12B.

A film scanning mechanism 34 is removably mounted to an upper portion of the machine stand 12 and on a lateral side of the presser cover 12B (i.e., on a right side of the paper of FIG. 1), and is used to reproduce a small-sized transmission original such as negative films from 35 mm-size to Brownie size, slide or the lie. When a relatively large-sized transmission original such as slide of a 4×5 size, proof, sleeve or the lie is reproduced, the presser cover 12B is removed or opened.

Further, a monitor 7 is disposed on an upper portion of the machine stand 12 and on the rear side of the film scanning mechanism 34 and displays an original image read by a line sensor 70 which will be described later, prior to exposure processing of the photosensitive material.

Figure 2:
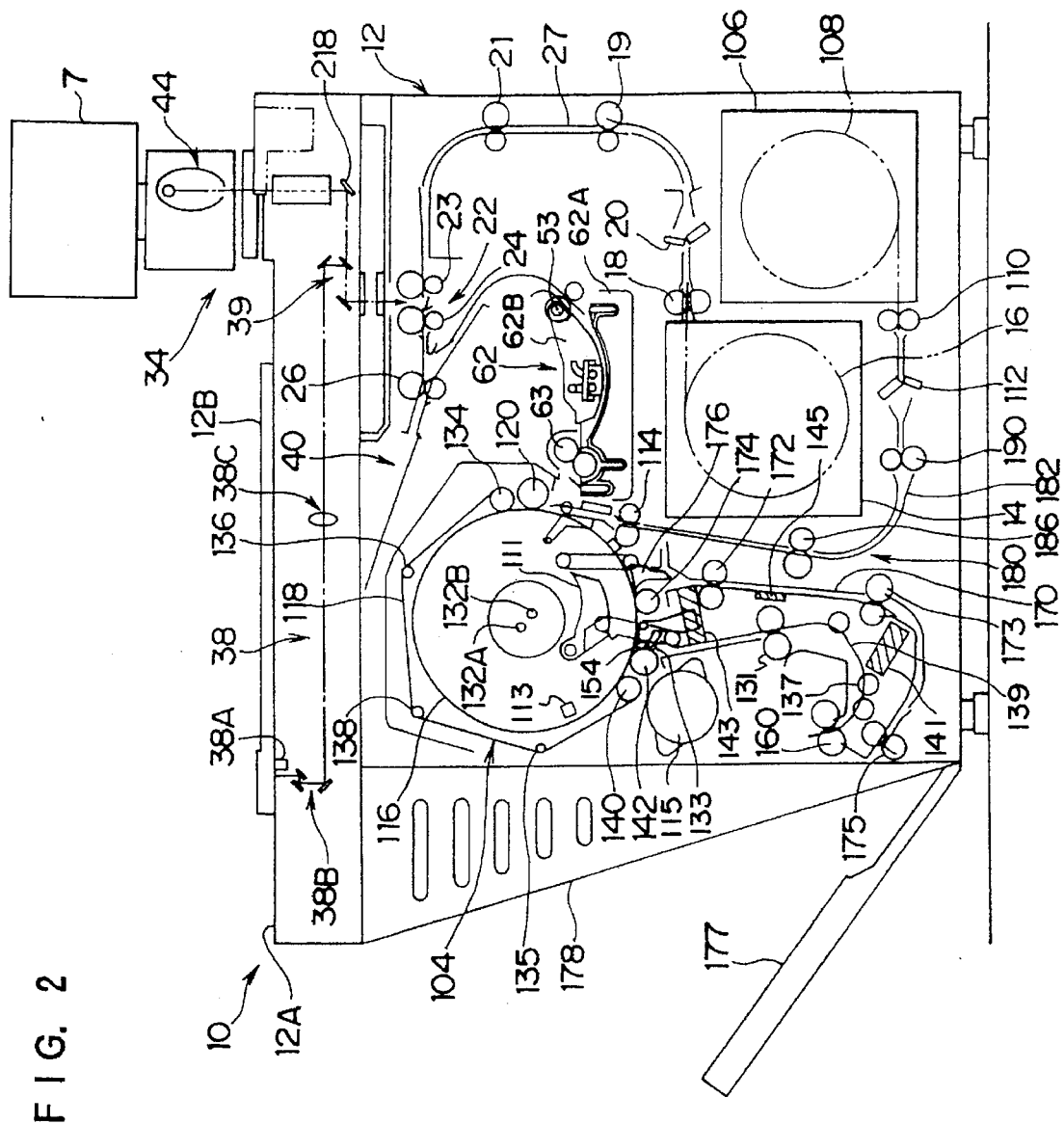
FIG. 2 is a schematic structural view of the image recoding device according to the first and second embodiments.

As shown in FIG. 2, a photosensitive material magazine 14, in which a photosensitive material 16 serving as an image receiving element and wound in roll form is accommodated, is disposed within the machine stand 12. The photosensitive material magazine 14 is set such that the photosensitive surface (exposure surface) of the photosensitive material 16 pulled out from the photosensitive material magazine 14 is oriented toward the bottom of the device. Nip rollers 18 and a cutter 20 are disposed in a vicinity of the opening of the photosensitive material magazine 14 from which the photosensitive material 16 is pulled out. After a predetermined length of the photosensitive material 16 has been pulled out from the photosensitive material magazine 14, the photosensitive material 16 is cut by the cutter 20.

The cutter 20 is formed from, for example, a fixed cutting edge and a moving cutting edge. The photosensitive material 16 is cut in such a manner that the moving cutting edge is moved vertically by a cam or the like and engaged with the fixed cutting edge. After the cutter 20 operates, the nip rollers 18 rotate reversely and conveys the photosensitive material 16 in a direction opposite to the conveying direction of the photosensitive material 16 to a degree that a leading end portion of the photosensitive material 16 is barely nipped by the nip rollers 18. Meanwhile, after the photosensitive material 16 is conveyed in the reverse direction, it may be released from being nipped by the nip rollers 18 so as to prevent the leading end portion of the photosensitive material 16 from being damaged.

A plurality of conveying rollers 19, 21, 23, 24, 26 are arranged sequentially next to the cutter 20 and guide plates 27 are disposed between the respective conveying rollers. The photosensitive material 16 which has been cut to the predetermined length is conveyed by the plurality of conveying rollers 19, 21, 23, 24, 26 and the guide plates 27 to an exposure section 22 which is provided between the conveying rollers 23, 24.

A switch back section 40 is provided next to the exposure section 22 and a water applying section 62 is provided below the exposure section 22. The photosensitive material 16 is, after conveyed upwardly by the side of the photosensitive material magazine 14 and exposed at the exposure section 22, delivered into the switch back section 40. Thereafter, the reverse rotation of the conveying rollers 28 causes the photosensitive material 18 to be delivered into the water applying section 62 via a conveying path provided below the exposure section 22.

The water applying section 62 has an application tank 62A filled with an image-receiving solvent, and a guide member 62B disposed to face the application tank 62A. A plurality of pipes are connected to the water applying section 62, and water is supplied via these pipes. Further, supply rollers 58 are disposed at an upstream end portion of the application tank 62A of the water applying section and deliver the photosensitive material 16 into the application tank 62A, and squeeze rollers 68 are disposed at a downstream end portion of the application tank 62A and remove excess water from the photosensitive material The photosensitive material 18 exposed at the exposure section 22 is conveyed between the application tank 62A and the guide member 62B by the supply rollers 58, and water serving as an image forming solvent is applied thereto. Thereafter, the photosensitive material 16 is conveyed in a state of being nipped by the squeeze rollers 68 and excess water is removed from the photosensitive material 16. The guide member 62B is made of metal such as aluminum and is disposed coaxially with the supply rollers 53 so as to be rotatably supported thereby. For this reason, the guide member 62B can move close to and away from the application tank 62A.

A plurality of rows of ribs are formed on the bottom surface of the application tank 62A, i.e., the surface which faces the exposure surface of the photosensitive material 16, and are disposed in an inclined manner with respect to the direction in which the photosensitive material 16 is conveyed. These ribs are used to reduce frictional resistance when the photosensitive material 16 passes through the water applying section 62 and to prevent a fixed position of the photosensitive material 16 from being damaged.

A heat developing transfer section 104 which will be described later is disposed next to the water applying section 62. The photosensitive material 16 to which water has been applied is delivered into the heat developing transfer section 104.

A receiving material magazine 106, in which an image receiving material 108 wound in roll form is accommodated, is disposed next to the photosensitive material magazine 14. A dye fixing material having mordant is applied to the image forming surface of the image receiving material 108. The receiving material magazine 106 is set such that the image forming surface of the image receiving material 108 pulled out from the receiving material magazine 106 is oriented toward the top of the device. Nip rollers 110 and a cutter 112 are disposed sequentially in order from a vicinity of the opening of the receiving material magazine 106 from which the image receiving material 108 is withdrawn. After the image receiving material 108 has been pulled out by the nip rollers 110, the nip rollers 110 releases the image receiving material 108 from being nipped thereby and a leading end portion of the image receiving material 108 is prevented from being damaged.

After a predetermined length of the image receiving material 108 has been pulled out from the image receiving material magazine 106, the image receiving material 108 is cut by the cutter 112. The cutter 112 is formed from, for example, a fixed cutting edge and a moving cutting edge, and cuts the image receiving material 108 in such a manner that the moving cutting edge is moved vertically by a cam or the lie and is engaged with the fixed cutting edge. It should be noted that in order to easily peel the image receiving material 108 after subjected to heat development processing (which will be described later), the image receiving material 108 is cut such that respective dimensions of the image receiving material 108 in the longitudinal direction (i.e., the conveying direction) and in the transverse direction (i.e., the direction perpendicular to the conveying direction) is made shorter than those of the photosensitive material 16.

An image-receiving material conveying section 180, which is equipped with conveying rollers 190, 186, 114 and guide plates 182, is provided next to the cutter 112. The image receiving material 108 which has been cut to the predetermined length is conveyed to the heat developing transfer section 104 by the respective conveying rollers and the guide plates 182 of the image-receiving material conveying section 180. It should be noted that the conveying rollers 114 also serve as registration rollers for correcting so-called skew of the conveyed image receiving material 108. Accordingly, skew of the image receiving material 108 is corrected.

The photosensitive material 16 conveyed to the heat developing transfer section 104 is delivered between a laminating roller 120 and a heat drum 116. An outer peripheral surface of the laminating roller 120 is coated with silicone rubber (for example, having a thickness of 2.53 mm and a hardness of about 40 degrees). Further, the laminating roller 120 is urged by a predetermined force (for example, 9 kg or thereabouts) at both end portions in an axial direction of the laminating roller 120 and is adapted to abut by pressure against the heat drum 116 of the heat developing transfer section 104.

Synchronously with the conveying of the photosensitive material 16, the image receiving material 108 is conveyed between the laminating roller 120 and the heat drum 116 in a state in which the photosensitive material 16 precedes the image receiving material 108 by a predetermined length, and the photosensitive material 16 and the image receiving material 108 are superposed. Each conveying speed of the squeeze rollers 63 and the conveying rollers 114 is set a little slower than the conveying speed at which the photosensitive material 16 and the image receiving material 108 are conveyed by the laminating roller 120 (for example, by 2% or thereabouts). Accordingly, the photosensitive material 16 and the image receiving material 108 are conveyed by the laminating roller 120 while undergoing a little back tension. Further, the photosensitive material 16 is made a little longer than the image receiving material 108 in the longitudinal and transverse directions. Thus, the photosensitive material 16 and the image receiving material 108 are superposed in a state in which all of respective sides of the photosensitive material 16 project from the image receiving material 108.

A cam 111 and a filler 113 are fixed to a side surface of the heat drum 116. The cam 111 can engage with a peeling claws 154 and 176 described later and is rotated in such a manner as to sequentially engage with the peeling claws 154 and 176 by rotation of the heat drum 116. The filler 113 is used to detect registration of the photosensitive material 16 and the image receiving material 108 with respect to the heat drum 116.

A pair of halogen lamps 132A, 132B are disposed at the interior portion of the heat drum 116. For example, these halogen lamps 132A, 132B respectively have outputs of 400 W and 450 W of electric power, and raise the surface temperature of the heat drum 116 to a predetermined value (for example, 82°). Meanwhile, both of halogen lamps 132A, 132B are used when the temperature of the heat drum 116 increases, and only one halogen lamp 132A is used during a normal operation after the temperature of the heat drum 116 increases to the predetermined value.

Five training rollers 134, 135, 136, 138, 140 are disposed at the outer peripheral side of the heat drum 116 and an endless press-contact belt 118 is trained around these training rollers. The endless press-contact belt 118 between the training roller 134 and the training roller 140 contact by pressure the outer periphery of the heat drum 116. The endless press-contact belt 118 is rotated by rotation of the training roller 140, and the rotating force is transmitted to the heat drum 116 by frictional force of the endless press-contact belt 118 and the heat drum 116 so that the heat drum 116 is driven thereby.

The endless press-contact belt 118 is formed with a textile material being covered with rubber. The training rollers 134, 135,136 and 138 are each made of stainless steel, and the training roller 140 is made of rubber. Further, the training roller 138 is formed such that both end portions thereof in the axial direction gradually increase in diameter in an outward direction of the axial direction, and is urged by force of about 2 kg in a direction of moving away from the heat drum 116 at the both axial-directional end portions. For this reason, the endless press-contact belt 118 is maintained with a fixed tension and the force of the endless press-contact belt 118 contacting by pressure the heat drum 116 is maintained. Further, offset of the endless press-contact belt 118 due to the rotation thereof can be prevented.

A drum motor 115 drives together a plurality of drive portions, namely, training roller 140, laminating roller 120, squeeze roller 63, and a bending/guiding roller 142, peeling roller 174, discharge roller 131, 160, receiving material discharge roller 172, 173, 175, and the like, of which latter members excepting the former three members which will be described later.

The photosensitive material 16 and the image receiving material 108 superposed by the laminating roller 120 are nipped in a superposed state between the heat drum 116 and the endless press-contact belt 118, and are conveyed over approximately ⅔ of the periphery of the heat drum 116 (between the training roller 134 and the training roller 140). When the photosensitive material 16 and the image receiving material 108 have been brought into a state of being completely accommodated between the heat drum 116 and the endless press-contact belt 118, the heat drum 116 (i.e., the training roller 140) stops rotating and heats the photosensitive material 16 and the image receiving material 108 for a predetermined time. When the photosensitive material 16 is heated, mobile dyes are released therefrom. The mobile dyes are transferred to a dye fixing layer of the image receiving material 108 and an visual image is formed on an image receiving surface of the image receiving material 108.

The bending/guiding roller 142 is disposed at the lower portion of the heat drum 116 at the downstream side in the material supplying direction of the endless press-contact belt 118. The bending/guiding roller 142 is made of silicone rubber and contacts by pressure an outer peripheral surface of the heat drum 116 by a predetermined force. Then, the bending/guiding roller 142 further conveys the photosensitive material 16 and the image receiving material 108, which have been conveyed by the heat drum 116 and the endless press-contact belt 118.

A peeling claw 154 and a pinch roller 133 are disposed at the lower portion of the heat drum 116 at the downstream side of the bending/guiding roller 142 in the material supplying direction. The peeling claw 154 is pivotably supported by the shaft and is pivoted by the cam 111 so as to be capable of moving close to and away from the surface of the heat drum 116. Further, the pinch roller 133 is usually adapted to contact by pressure the bending/guiding roller 142 with a predetermined pressure. When the peeling claw 154 contacts the heat drum 116 as it is pivoted, the pinch roller 133 moves away from the bending/guiding roller 142.

When the photosensitive material 16 and the image receiving material 108 are conveyed to the position of the peeling claw 154, the peeling claw 154 abuts against the heat drum 116 by the cam 111. The leading end portion of the photosensitive material 16, in a state in which the photosensitive material 16 precedes the image receiving material 108 by a predetermined length, engages with the peeling claw 154. The peeling claw 154 is used to peel the photosensitive material 16 from the outer periphery of the heat drum 116.

When the leading end portion of the photosensitive material 16 by the predetermined length is peeled from the heat drum 116, the peeling claw 154 moves away from the heat drum 116 by the cam 111. At the same time, the pinch roller 133 abuts against the bending/guiding roller 142 and nips, together with the bending/guiding roller 142, the peeled leading end portion of the photosensitive material 16. Accordingly, the photosensitive material 16 peeled from the heat drum 116 is conveyed downward by the pinch roller 113 and the bending/guiding roller 142.

The discharge rollers 131 and 160, a plurality of guide rollers 137, and a conveying guide plate 139 are disposed at the downstream side of the pinch roller 133 and the bending/guiding roller 142. The photosensitive material 16 peeled from the heat drum 116 is conveyed downward thereby and accumulated in a waste photosensitive material accommodating box 178. Each conveying speed of the discharge rollers 131 and 160 is set slower by approximately 1 to 3% than the rotational peripheral velocity of the heat drum 116, so that excess tension is not applied to the photosensitive material 16. Further, a dry fan 141 is disposed in a vicinity of the conveying guide plate 139 to make it easy to dry the photosensitive material 16.

The peeling roller 174 and the peeling claw 176 are disposed at the downstream side of the bending/guiding roller 142 and the peeling claw 154 in a rotational direction of the heat drum 116. The peeling roller 174 and the peeling claw 176 are used to peel the image receiving material 108, which has not been peeled by the peeling claw 154, from the outer periphery of the heat drum 116.

The peeling roller 174 is made of silicone rubber having surface roughness of 25S or more according to the Japanese Industrial Standard (JIS) B 0601 (Definitions and Designation of Surface Roughness). The peeling roller 174 is adapted to contact by pressure the outer periphery of the heat drum 116 with a predetermined pressure and is rotated by the drum motor 115 in the above-described manner. When the photosensitive material 16 is peeled and only the image receiving material 108 is conveyed by the heat drum 116, the peeling claw 176 abuts against the heat drum 116 by the cam 111. The peeling claw 176 peels the leading end portion of the image receiving material 108. The peeling roller 174 and the peeling claw 176 in a state of abutting against the heat drum 116 bend, guide and convey the image receiving material 108 downward.

Receiving material discharge rollers 172, 173, 175 are disposed sequentially in order from and below the peeling roller 174 and the peeling claw 176. A receiving material guide 170 is disposed between these discharge rollers. The image receiving material 108, which has been peeled by the peeling roller 174 and the peeling claw 176, is guided and conveyed by these receiving material discharge rollers and is discharged into a tray 177.

Meanwhile, a drum fan 143 is disposed in a vicinity of the conveying guide plate 170 to make it easy to dry the image receiving material 108 together with heating of the heat drum 116. The drum fan 143 operates in correspondence with atmospheric conditions only when necessary, so that the temperature distribution of the heat drum 116 is made uniform. In addition, a ceramic heater 145 is disposed on the conveying guide plate 139 to make it still easier to dry the image receiving material 108. It should be noted that the temperature of the ceramic heater 145 is 70° C. or thereabouts.

The heat developing transfer section 104 having the above-described structure is on the whole formed as one unit and is disposed at a side of the machine stand 12 opposite to the water applying section 62. For this reason, after the side surface door 9 (see FIG. 1) of the machine stand 12 is opened, a jamming operation or the like can be easily be effected by opening and moving the heat developing transfer section 104.

Next, a description will be given of an original scanning mechanism 38 and a film scanning mechanism 34 of the image recording device 10 with reference to FIG. 3A.

The original scanning mechanism 38 is provided above the exposure section 22 and below the transparent glass plate 12C. The photosensitive material 16 is, in the exposure section 22, slit-scanned and exposed with slit light carrying original image information from the original scanning mechanism 38 or the film scanning mechanism 34 which will be described later.

The original scanning mechanism 38 is an exposure optical system which is used when, basically, image reproduction of the reflection original such as printed matter, photograph or the like, and of the relatively large-sized transmission original such as proof, sleeve or the like is performed. Meanwhile, when an image of the relatively large-sized transmission original such as proof, sleeve or the like is reproduced, the presser cover 12B is removed and a transmission-original light source unit by which the transmission original placed on the original loading stand 12A is illuminated from an upward direction is placed in a predetermined position.

The original scanning mechanism 38 includes a halogen lamp 38A, a reflector 38E, a mirror unit 38B, which move alone and below the transparent glass plate 12C, a lens unit 38C, a mirror unit 39 for guiding light emitted from the lens unit 38C to the exposure section 22, a color filter unit 144 described later, an unillustrated diaphragm and an unillustrated image sensor. A drive circuit 38D (see FIG. 5) for moving the halogen lamp 38A, mirror unit 38B and the like of the original scanning mechanism 38 is connected to a control device 250. Accordingly, the original scanning mechanism 38 is actuated in accordance with instructions from the control device 250.

The original scanning mechanism 38 moves on a lower surface of the original loading stand 12A in a scanning direction indicated by arrow B and illuminates the reflection original by the halogen lamp 38A. The reflector 38E also serves as a slit used to control the wide in the scanning direction of reflected light from a reflection original (or transmitted light from a transmission original), which is emitted from the halogen lamp 38A. The mirror unit 38B moves in the same direction as the original scanning mechanism 38 at a speed of ½ of the scanning speed of the original.

The unillustrated diaphragm is, for example, provided within the lens unit 38C and is disposed in a direction perpendicular to an optical path. The unillustrated diaphragm may be formed by two shading plates which can be freely inserted into the optical path, and in this case, a gap between the shading plates is adjusted to control the amount of reflected light.

The color filter unit 144 is, for example, formed from three color filter plates of Y (yellow), M (magenta) and C (cyan) filters. By controlling an amount by which each of color filter plates is inserted into the optical path, color balance of reflected light is adjusted.

The mirror unit 39 is formed by three mirrors 39A, 39B, 39C. Light emitted substantially horizontally from the lens unit 38B is reflected substantially perpendicularly (downward) by the mirror 39A, is reflected substantially perpendicularly (in a horizontal direction) by the reflection of the mirror 39B, and is reflected substantially perpendicularly (downward) by the mirror 39C, such that the light is guided to the exposure section 22. The mirror 39B is moved by the driver 39D (see FIG. 5) connected to the control device 250 in accordance with instructions from the control device 250. Namely, the mirror 39B is moved to the position indicated by the solid line in FIG. 3A or the position indicated by the imaginary line in FIG. 3A.

Moreover, the original scanning mechanism 38 is provided with unillustrated image sensors used to measure an amount of reflected light for each color of red(R), green(G) and blue(B). These image sensors read an original image by pre-scanning to determine an adjustment amount by the unillustrated diaphragm, respective amounts by which color filter plates of the color filter unit 144 are inserted into the optical path, and the like. When an image of the large-sized transmission original is reproduced by using the original scanning mechanism 38, the original scanning mechanism 38 scans the lower surface of the original loading stand 12A without the halogen lamp 38A being turned on, and the slit light is transmitted through the transmission original. However, if the halogen lamp 38A is turned on so that images on both sides of the original may be reproduced, when, for example, a seal or the like is attached to the transmission original, graphic symbols, characters and the like which are printed on one side of the seal can also be reproduced.

The film scanning mechanism 34 is provided next to the original scanning mechanism 38. The film scanning mechanism 34 is, briefly speaking, used to illuminate light from the lamp to a film original which moves synchronously with the conveying of the photosensitive material 16. When the transmitted light passing through the film original and the slit is magnified by a zoom lens and is projected on the photosensitive material 16, the photosensitive material 16 is exposed with the transmitted light passing through the film original and an image of the film original is reproduced on the photosensitive material 16.

The film scanning mechanism 34 includes a light source unit 44 disposed above the machine stand 12. A lamp 48 serving as a light source of the present invention and a reflector 46 serving as illumination means of the present invention are provided within a casing 44A of the light source unit 44.

The lamp 48 is a rod-shaped light source which extends in one direction and the longitudinal direction of the lamp 48 is disposed along the longitudinal direction of a slit 57 which will be described later. In FIG. 3A, the direction perpendicular to the paper of this drawing is the longitudinal direction of the lamp 48. It should be noted that a light source for color such as a halogen lamp, a flash lamp or the like can be used as the lamp 48.

Further, the reflector 46 contains the lamp 48 at an upper portion thereof to improve utilization efficiency of the light from the lamp 48. It should be noted that the reflector 46 has an opening for the passing of light at a lower end of the reflector 46 and an opening for the insertion of color filters of a light-adjusting filter section 50, which will be described later, at a side surface thereof.

An infrared-ray absorption filter (which is hereinafter referred to as an IR filter) 168 is disposed beneath the lamp 48 and within the reflector 46 in such a manner as to separate a space in which the lamp 48 is disposed from a lower-side space. The IR filter 168 is used to cut off infrared rays to protect the film original 59 from being damaged by heat.

A condenser lens 81 is disposed beneath the IR filter 168 and above the light-adjusting filter section 50. The condenser lens 81 is used to gather light in a vicinity of the optical axis of the zoom lens 72 serving as a part of an image-forming optical system to improve light-gathering efficiency, and to increase light perpendicularly incident on the film original 59, a diffusing glass 73 which will be described later, or the like.

As described above, the light-adjusting filter section 50 is disposed beneath the condenser lens 81. The light-adjusting filter section 50 is used to adjust color balance of light illuminated on the film original 59 and to adjust color balance of a formed image. The light-adjusting filter section 50 is formed by respective color filters of C(cyan), M(magenta), Y(yellow) and a driver for moving these color filters. Each of color filters is moved with respect to the optical axis of the lamp 48 in accordance with instructions from the control device 250. It should be noted that the reflector 46 gathers at least one of light from the lamp 48 and light transmitted through the light-adjusting filter section 50.

Figure 4A:
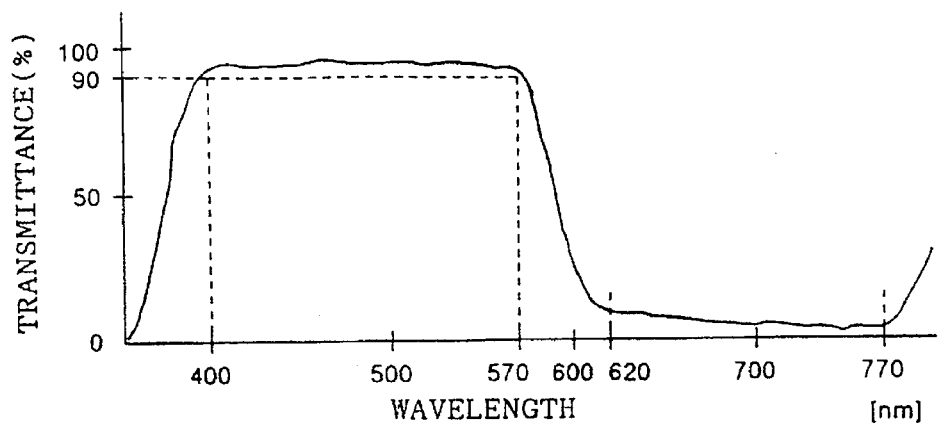
FIG. 4A is a graph showing the spectral characteristics of a C filter.

The spectral characteristics of the color filters of the light-adjusting filter section 50 are described in detail. As shown in FIG. 4A, the spectral characteristic of the C filter is set such that the transmission wavelength range when the transmittance is 90% or more is approximately 400 nm to 570 nm, the transmission wavelength at the transmittance of 50% is approximately 580 nm, and the wavelength range when the transmittance is 1% or less is approximately 620 nm to 770 nm.

Figure 4B:
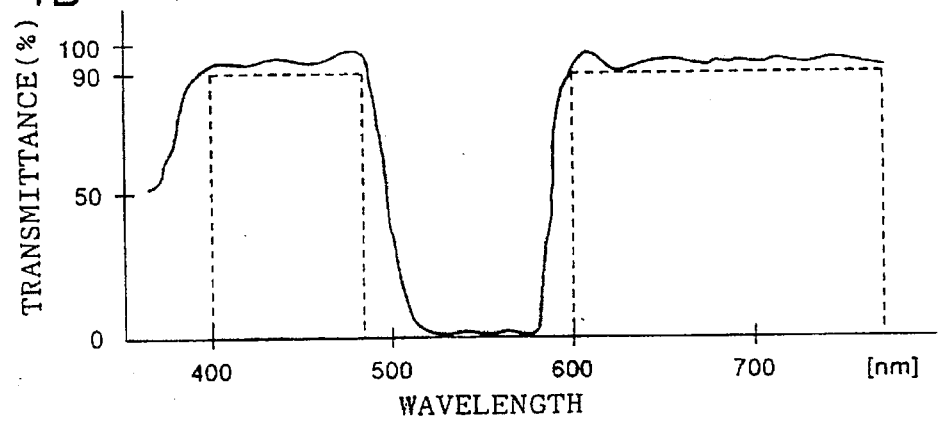
FIG. 4B is a graph showing the spectral characteristics of an M filter.

As shown in FIG. 4B, the spectral characteristic of the M filter is set such that the transmission wavelength range when the transmittance is 90% or more is approximately 400 nm to 490 nm and approximately 600 nm to 770 nm, the transmission wavelength at the transmission of 50% is approximately 500 nm and 590 nm, and the wavelength range when the transmittance is 1% or less is approximately 510 nm to 580 nm.

Figure 4C:
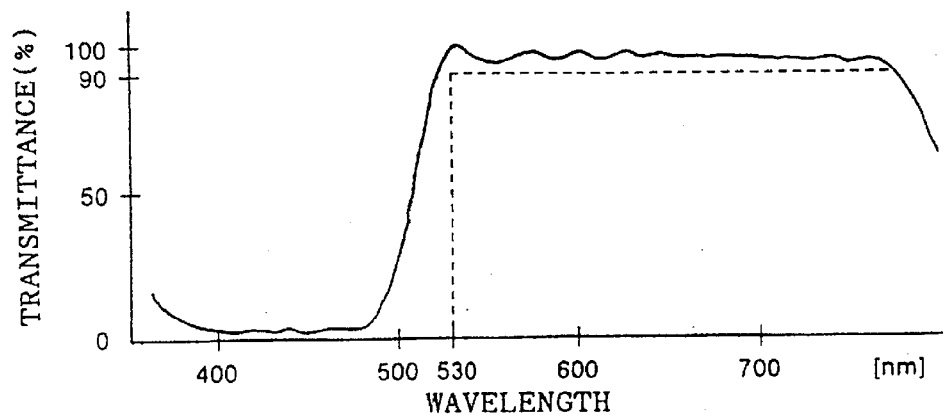
FIG. 4C is a graph showing the spectral characteristics of a Y filter.

As shown in FIG. 4C, the spectral characteristic of the Y filter is set such that the transmission wavelength range when the transmittance is 90% or more is approximately 530 nm to 770 nm, the transmission wavelength at the transmittance of 50% is approximately 520 nm, and the wavelength range when the transmittance is 1% or less is approximately 400 nm to 490 nm.

Thus, the color balance of light illuminated on the film original 59, i.e., light for exposure of the photosensitive material 16, is adjusted by the respective color filters, so that the color balance of a formed image is also adjusted.

A light-attenuating filter 54, which adjusts the amount (intensity) of light illuminated on the film original 59, is disposed below the lower-end opening portion of the reflector 46. The light-attenuating filter 54 moves with respect to the optical axis from a reference position by a driver 54A (see FIG. 5). The driver 54A is connected to the control device 250 and moves the light-attenuating filter 54 in accordance with instructions from the control device 250 such that the light-attenuating filter 54 advances onto and withdraws from the optical axis in the direction indicated by the arrow A in FIG. 3A.

As illustrated in FIG. 6, the light-attenuating filter 54 is formed with predetermined derivatives deposited on a transparent flat plate, for example, a glass flat plate, and has sharp-pointed regions 54A1, 54A2, 54A3, . . . which are a light-attenuation area of the present invention and each have a fixed transmittance, and a rectangle-shaped region 54B having the same transmittance as that of the above-described light-attenuation area of the present invention. The amount of light transmitted through the sharp-pointed regions 54A1, 54A2, 54A3, . . . and the rectangle-shaped region 54B is set a predetermined target amount of light (i.e., the minimum amount of light, for example, 10% of the amount of light gathered by the reflector 46) by the predetermined derivatives deposited on the sharp-pointed regions 54A1, 54A2, 54A3, . . . and the region 54B. Further, a predetermined region (having width R0) in which the above-described derivatives are not deposited is provided at one end side of the light-attenuating reflector 54. It should be noted that it is possible to arbitrarily vary the amount of light transmitted through the sharp-pointed regions 54A1, 54A2, 54A3, . . . and the rectangle-shaped region 54B depending upon derivatives deposited thereon.

The sharp-pointed regions 54A1, 54A2, 54A3, . . . are each formed to become wide from a leading end of the filter 54 in a direction in which a scan table 58 moves (i.e., the direction of arrow A in FIG. 8A and FIG. 6) to a base end thereof in such a manner as to extend linearly in a direction crossing the direction of arrow A (for example, a direction perpendicular to that of arrow A). Meanwhile, as for the direction crossing the direction of arrow A, in addition to the direction crossing that of arrow A, a direction substantially perpendicular to the direction of arrow A is applicable.

As illustrated in FIG. 6, the sharp-pointed regions 54A1, 54A2, 54A3, . . . are each formed in an isosceles triangle having height R1 in the direction of arrow A. Further, the maximum width L1 of each of the regions 54A1, 54A2, 54A3, . . . is shorter than the diameter L0 of a circle of confusion C formed on the surface of the light-attenuating filter 54 by the zoom lens 72. The region 54B is a light-attenuation area (having length R2) provided from the base ends of the above-described regions 54A1, 54A2, 54A3, . . . to the other end of the light-attenuating filter 54. This light-attenuating area 54B is larger than a region where the slit light is imaged on the photosensitive material 16.

Disposed beneath the light-attenuating filter 54 are a UV cut filter 77A for cutting off ultraviolet rays, a B-G notch filter 77B for separating blue light and green light from each other, a diffusion glass 73 used to diffuse and mix light of which color is adjusted by the light-adjusting filter section 50 and of which amount (density) is adjusted by the light-attenuating filter 54 and to cause the adjusted light to be made perpendicularly incident on the film original 59 as homogeneous light having no uneven color or no irregularity in illumination, and a Fresnel lens 79. It should be noted that the diffusion glass 73 serves to reduce the irregularity in the quantity of light, which is caused by variation of the position of a filament or the like within the lamp 48 which is the rod-shaped light source.

The film original 59 is loaded on the scan table 58 disposed below the Fresnel lens 79. The scan table 58 scans the film original 59 in such a manner as to convey the film original 59 in the direction indicated by arrow A In FIG. 3A (to correspond to the direction of relative movement of time present invention) synchronously with the conveying of the photosensitive material 16 while holding the film original 59 at a predetermined position. The scan table 58 is driven by the drive circuit 58A connected to the control device 250.

With the movement of the scan table 58 in the direction of arrow A in FIG. 3A, light gathered by the reflector 46 moves relative to the film original 59 held on the scan table 58. It should be noted that the method in which the film original 59 is moved by the scan table 58 is not particularly limited. Accordingly, any publicly-known conveying means using thread transmission, winding transmission, rack-and-pinion or the like can be used.

Prior to the image recording of the film original 59, the image recording device 10 of the present embodiment reads images of the film original 59 by pre-scanning to determine an amount of exposure at the time of image recording, i.e., the amounts by which the color filters of the light-adjusting filter section 50 is inserted into the optical path and the amount by which the light-attenuating filter 54 is inserted into (or withdraws from) the optical path (which will be hereinafter referred to as photometry).

The slit 57 which is the slit of the present invention is provided beneath the scan table 58. Light transmitted through the film original 59 is made incident, as the slit light, on a film photometry unit 60 by the slit 57.

The film photometry unit 60 is equipped with a mirror 64. The mirror 64 is, at the time of pre-scanning, inserted into the optical path as indicated by the dotted line in FIG. 3A and deflects the light transmitted through the film original 59 by 90°. The mirror 64 is moved by the driver 64A connected to the control device 250 in accordance with instructions from the control device 250. Namely, the mirror 64 is moved to a position on the optical path of the slit light transmitted through the region at which the scan table 58 is disposed (i.e., the position indicated by the solid line in FIG. 3A, referred to as the "photometry position") or a position withdrawn from the optical path (i.e., the position indicated by the dotted line in FIG. 3A, referred to as the "withdrawn position").

A lens 68 and a line sensor 70 are disposed sequentially in order from the slit light exiting side of the mirror 64 at the photometry position. The lens 68 is formed such that the slit light incident thereon is imaged onto the light-receiving surface of the line sensor 70. The line sensor 70 is provided with a plurality of light-receiving elements which are arranged in three rows. The line sensor 70 is, for example, a MOS (NMOS or CMOS) line sensor having 256 pixels and reads, for each of colors R, G, B, an image on the film original 59 at resolution with 256 pixels for one line.

Each row of light-receiving elements is provided with a filter through which only light of wavelengths of R, G, B, respectively, is transmitted. The amounts of light of the respective component color lights R, G, B which are transmitted through a region corresponding to one pixel row of the image of the film original are measured by the respective light-receiving element rows. The line sensor 70 is connected to the control device 250, and the measured results are outputted to the control device 250. The control device 250 delivers image signals read by the line sensor 70 to a monitor drive circuit 7A. The monitor drive circuit 7A effects correction of the delivered image signals by an LATD or the like and displays them as the image data on the monitor 7. Further, the control device 250 determines an image feature amount from these image signals and determines proper exposure conditions, or determines an image feature amount of a specified main portion as occasion demands and corrects exposure conditions, and further, determines exposure conditions with manual adjustment of color and/or density being added to these exposure conditions or corrected exposure conditions.

After the photometric processing has been completed, the mirror 64 is moved to the withdrawn position by the driver 64A. Light transmitted through the slit 57 is sent to a lower side of the mirror 64 and is made incident on the zoom lens 72 serving as an imaging lens of the present invention. The zoom lens 72 of this embodiment magnifies the transmitted light from the film original 59, which has been transmitted through the slit 57, by 200% to 850%, and the transmitted light is imaged at an exposure position of the exposure section 22.

A mirror 74, which reflects toward the mirror 39B light exiting from the zoom lens 72, is disposed at the light exiting side of the zoom lens 72. When the mirror 89B has been moved to the position indicated by the imaginary line in FIG. 3A, the light reflected by the mirror 74 is made incident on the mirror 39C and is reflected thereby to the exposure section 22. The magnification of the zoom lens 72 is changed and the incident slit light is imaged at the exposure position of the exposure section 22. The image of the film original 59 is enlarged and exposed onto the photosensitive material 16 by the zoom lens 72. Meanwhile, in a case in which the image of the film original 59 is reproduced by using the film scanning mechanism 34, the mirror 39B pivots at the position indicated by the dotted line in FIG. 3A as described above.

The transmitted light from the film original 59 made incident on the mirror 39C and reflected downward is, as in a manner similar to the reflected light from the reflection original, imaged at a predetermined exposure position of the photosensitive material 16 scanned and conveyed by the conveying rollers 23 and 24, and the image is slit-scanned and exposed.

Here, the film original 59 is moved by the scan table 58 synchronously with the scanning/conveying speed of the photosensitive material 16. Namely, assuming that the enlargement ratio of a projection optical system is given n, the scan table 58 moves at the speed 1/n of the conveying speed of the photosensitive material 16. Accordingly, as the film original 59 moves over the whole image area, all of images of the film original 59 are scanned and exposed onto the photosensitive material 16.

As illustrated in FIG. 5, the control device 250 has a bus 260. A CPU 252, a ROM 254, a RAM 256 and an input/output port 258 are respectively connected to the bus 260. A control routine which will be described later is stored in the ROM 254. RAM 256 stores, as maps, an amount by which the light-attenuating filter 54 moves with respect to an amount of transmitted light (see FIG. 7) and amounts by which the color filters C, M and Y move with respect to the amount of transmitted light (see FIGS. 8A. 85 and 8C). It should be noted that, in place of these maps, an arithmetic expression of the amount by which the light-attenuating filter 54 moves with respect to the amount of transmitted light and arithmetic expressions of the amounts by which the color filters C, M and Y move, respectively, with respect to the amount of transmitted light may be stored in the RAM 256.

The light-adjusting filter section 50 is connected to the input/output port 258, and the halogen lamp 38A and the mirror unit 38B are respectively connected thereto via the drive circuit 38D. Further, the light-attenuating filter 54 and the scan table 58 are connected to the input/output port 258 via the driver 54A and the drive circuit 58A, respectively. Moreover, the mirror 64 and the mirror 39B are connected to the input/output port 258 via the driver 64A and the driver 39D, respectively, and the line sensor 70 is also connected thereto. Meanwhile, other components, for example, components or the like for conveying the photosensitive material 16 and the image receiving material 108, are also connected to the input/output port 258, but a description thereof will be omitted for convenience.

In operation, the paper original 13 is placed on the transparent glass plate 12C. When an unillustrated start button is pressed, the mirror 398 is moved to the position indicated by the solid line in FIG. 3A, and at the same time, the photosensitive material 16 is conveyed to the exposure section as will be described later. Next, the halogen lamp 38A is turn on and the halogen lamp 38A and the mirror unit 38B are moved along the transparent glass plate 12C. As a result, light emitted from the halogen lamp 38A and reflected at the paper original 13 is reflected by the mirror unit 38B, is transmitted through the lens unit 38C, is reflected by the mirror unit 39, and then is illuminated on the photosensitive material 16. Thus, the image of the paper original 13 are scanned and exposed onto the photosensitive material 16.

On the other hand, when the film original is placed on the scan table 58 and an instruction for exposing an image of the film original onto the photosensitive material 16 is inputted, the lamp 48 is turned on and the mirror 64 is moved to the photometry position. Further, the scan table 58 is moved to an initial position. The initial position is a place in which light emitted from the light source unit 44 is irradiated on an end portion of the image of the film original 59. As a result, the light transmitted through the end portion of the image of the film original 59 is transmitted through the slit 57 to form the slit light. The slit light is reflected by the mirror 64, is transmitted through the lens 68, and is imaged at the light-receiving surface of the surface of the line sensor 70. The light amounts of the respective component color lights R, G, B which are transmitted through the respective pixels forming one pixel row of the image of the film original 59 are measured at the line sensor 70.

Next, fetching of the measured data, which is outputted from the line sensor 70, is effected. The measurement data fetched from the line sensor 70, representing the light amounts of the respective component color lights, is converted into density data representing a density of each component color of each pixel forming one pixel row, and the converted density data is stored. Then, it is determined whether or not reading of image has been completed. When reading of the image has not been completed, the scan table 58 is moved by a predetermined amount corresponding to the pixel row width. Accordingly, the above-described operations are repeated until reading of images has been completed. As the scan table 58 (and the film original 59) moves gradually along the directions indicated by arrow A in FIG. 3A, the amounts of light transmitted through the image of the film original 59 are measured by the line sensor 70 for each pixel and for each of R, G and B. The measured data is successively converted into density data and stored.

When reading of the image has been completed, determination of the exposure conditions is effected on the basis of the stored density data for each pixel and each color of the film original 59. Any of various methods can be used to determine the exposure conditions. For example, the following method disclosed in U.S. Pat. No. 4,692,797 may be used. Feature information of the image of the film original 59 is extracted on the basis of the above-described density data, and the density and the color correction amount for the exposure conditions are calculated. The image which has been corrected by the correction amount is displayed on a display means such as a monitor or the like. The correction amount is modified such that the density and the color of a predetermined position on the displayed image, the position being designated by a designating means, become predetermined values. The exposure conditions can then be determined on the basis of the modified correction amount. In this way, the proper exposure conditions can be obtained easily without conducting lest exposure or the like.

When the exposure conditions have been determined in the above-described manner, the image of the film original 59 is exposed onto the photosensitive material 16. Namely, the scan table 88 is again moved to the initial position and the nip rollers 18 are operated, so that the photosensitive material 16 is pulled out of the photosensitive material magazine 14. When a predetermined length of the photosensitive material 16 has been pulled out, the cutter 20 is operated so that the photosensitive material 16 is cut to the predetermined length. The photosensitive material 16 cut to the predetermined length is conveyed to the exposure position of the exposure section 22, and the mirror 64 is moved to the withdrawn position. Further, the mirror 39B is moved to the position indicated by the imaginary line in FIG. 3A. Thus, light transmitted through the film original 59 and transmitted through the slit 57 to form the slit light is guided to the exposure section 22.

Subsequently, the respective color filters of the light-adjusting filter section 50 are moved in accordance with the determined exposure conditions, and the light-attenuating filter 54 is moved such that the photosensitive material 16 is exposed with light having a light amount corresponding to the exposure conditions and transmitted through the film original 59. This operation is described later with reference to the flow chart shown in FIG. 9.

In step 202, transmission amounts $T_C$, $T_M$, $T_Y$ of the color filters CMY in accordance with the exposure conditions are calculated by an exposure control algorithm. Assuming that an exposure amount of light transmitted through the C filter, illuminated onto the film original 59, transmitted through the film original 59 and exposing the photosensitive material 16 is given $E_C$, and exposure amounts corresponding to the color filters $M_Y$ are given $E_M$, $E_Y$, respectively, the respective transmission amounts $T_C$, $T_M$, $T_Y$ of the color filters CMY are obtained by the following expressions (1), (2) and (3).

$$T_C = \log E_C \times 1000 \tag{1}$$

$$T_M = \log E_M \times 1000 \tag{2}$$

$$T_Y = \log E_Y \times 1000 \tag{3}$$

In step 204, a target transmission amount $T_O$ of the light-attenuating filter 54 is calculated. The target transmission amount $T_O$ is calculated by subtracting 100 from the minimum value $T_{min}$ among the transmission amounts $T_C$, $T_M$, $T_Y$ of the color filters CMY. In this embodiment, although the target transmission amount $T_O$ of the light-attenuating filter 54 is calculated by subtracting 100 from the minimum value $T_{min}$ among the transmission amounts $T_C$, $T_M$, $T_Y$ of the color filters CMY, the target transmission amount $T_O$ may be calculated by subtracting any number, not 100 (for example, 80, 50, 30 or the like) from the minimum value $T_{min}$ among the transmission amounts $T_C$, $T_M$, $T_Y$ of the color filters CMY. Further, the minimum value $T_{min}$ among the transmission amounts $T_C$, $T_M$, $T_Y$ of the color filters CMY may also be determined as the target transmission amount $T_O$ of the light-attenuating filter 54.

Figure 7:
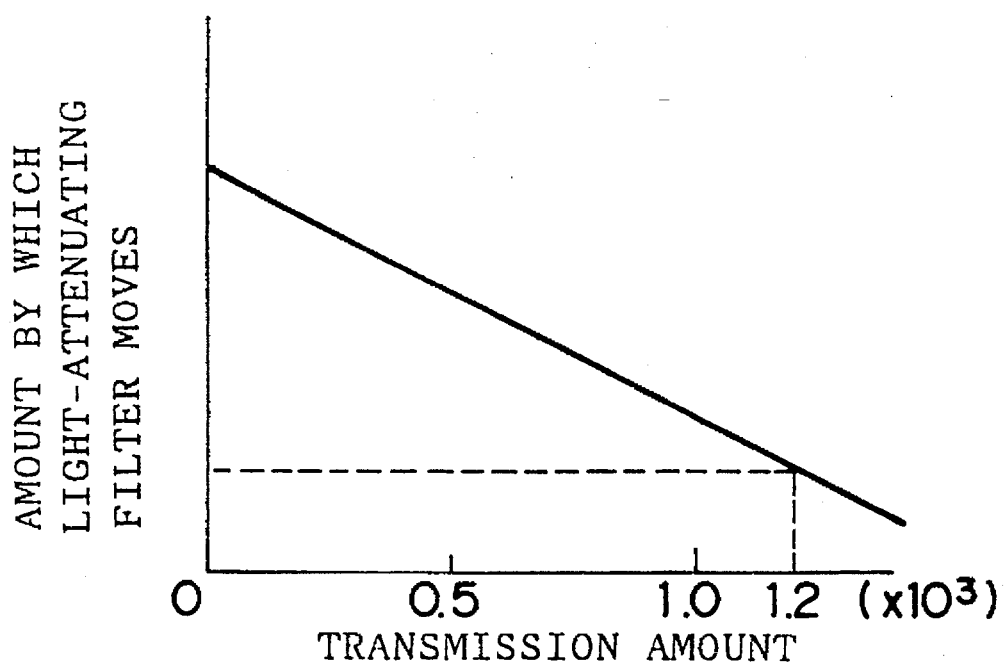
FIG. 7 is a graph showing a map of an amount by which the light-attenuating filter moves with respect to an amount of transmitted light stored in a ROM.

In step 206, an amount by which the light-attenuating filter 54 moves from the reference position such that a transmission amount of the slit light which was transmitted through the light-attenuating filter 54 becomes the target transmission amount $T_O$ is calculated from the map (see FIG. 7). When an arithmetic expression is stored in place of the map, the amount by which the light-attenuating filter 54 moves is calculated from such an expression.

In step 208, target transmission amounts $T_{CO}$, $T_{MO}$, $T_{YO}$ of the color filters CMY are calculated. Namely, the target transmission amount $T_{CO}$ of the C filter, the target transmission amount $T_{MO}$ of the M filter and the target, transmission amount $T_{YO}$ of the Y filter are respectively calculated by the following expressions (4), (5) and (6).

$$T_{CO} = T_C - T_O \quad (4)$$

$$T_{MO} = T_M - T_O \quad (5)$$

$$T_{YO} = T_Y - T_O \quad (6)$$

Figure 8A:
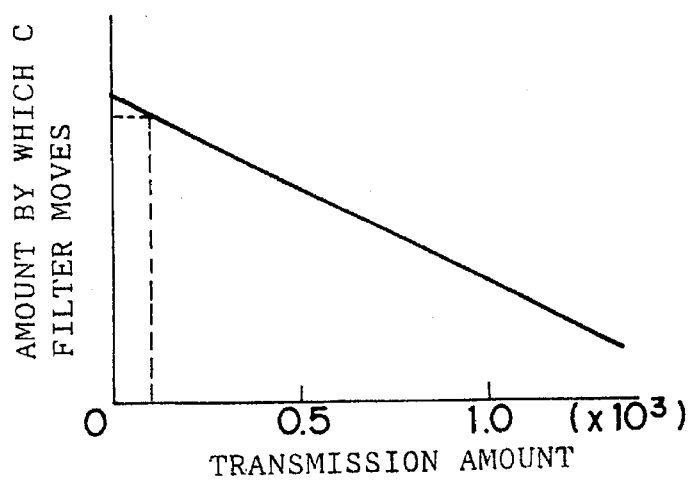
FIG. 8A is a diagram showing a map of an amount by which the C filter moves with respect to the amount of transmitted light, which is stored in the ROM.
Figure 8B:
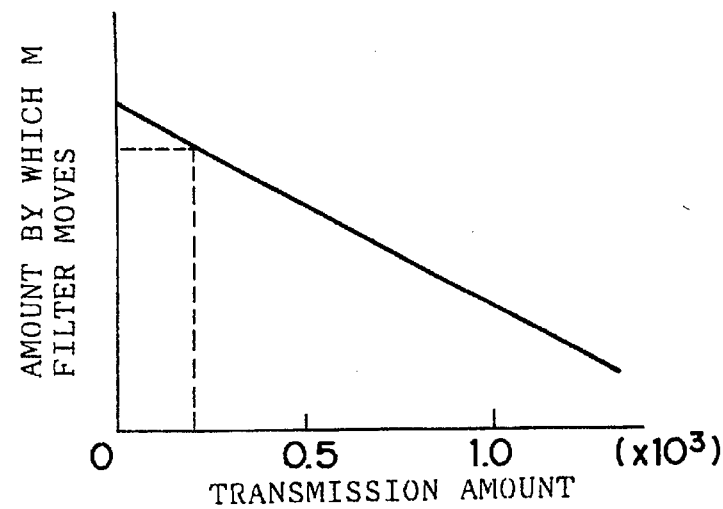
FIG. 8B is a diagram showing a map of an amount by which the M filter moves with respect to the amount of transmitted light, which is stored in the ROM.
Figure 8C:
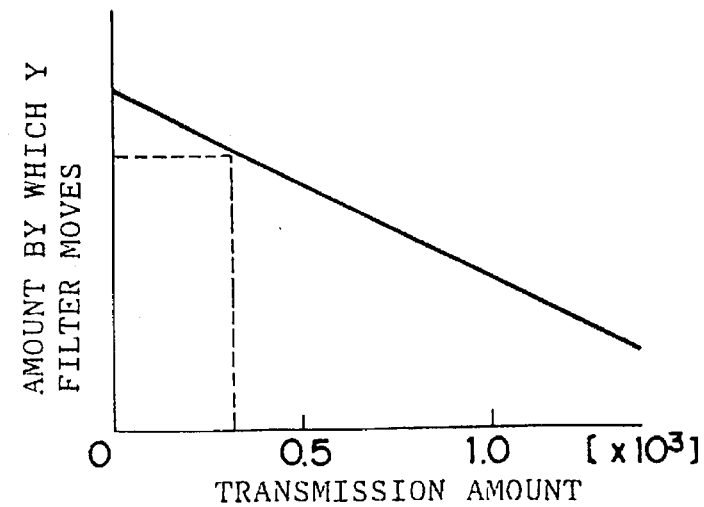
FIG. 8C is a diagram showing a map of an amount by which the Y filter moves with respect to the amount of transmitted light, which is stored in the ROM.

In step 210, respective amounts by which the color filters CMY moves from the reference positions such that the transmission amount of the color filters CMY respectively become the target transmission amounts $T_{CO}$, $T_{MO}$, $T_{YO}$ are calculated from the maps (see FIGS. 8A, 88, 8C). When arithmetic expressions are stored in place of these maps, the respective amounts by which the color filters move are calculated from such expressions.

In step 212, the light-attenuating filter 54 is moved by the amount by which it moves, which was calculated in step 206. In subsequent step 214, the color filters CMY are respectively moved by the amounts by which they moves, which was calculated in step 210. Thus, this control routine ends.

For example, when the calculated results are such that the transmission amount $T_C$ of the C filter is 1300, the transmission amount $T_M$ of the M filter is 1410, and the transmission amount $T_Y$ of the Y filter is 1520, the minimum value $T_{min}$ among these transmission amounts $T_C$, $T_M$, $T_Y$ is 1300. Further, the target transmission amount $T_O$ (=$T_{min}$− 100) of the light-attenuating filter 54 is 1200, the target transmission amount $T_{CO}$ of the C filter is 100, the target transmission amount $T_{MO}$ of the M filter is 210, and the target transmission amount $T_{YO}$ of the Y filter is 320. Thus, the color filters CMY and the light-attenuating filter 54 are moved by the respective calculated amount by which they moves such that these filters can obtain the respective calculated transmission amounts.

Figure 10:
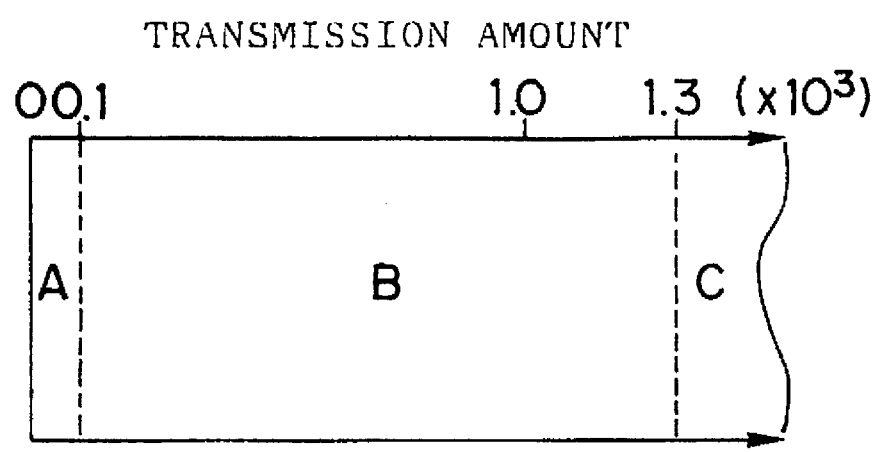
FIG. 10 is a diagram showing the range of an amount of transmitted light when only each filter of three colors CMY is used, and the range of an amount of transmitted light when only the light-attenuating filter and each filter of three colors CMY are used.

Meanwhile, when it is necessary to attenuate the transmitted light such that the minimum value $T_{min}$ among the respective transmission amounts $T_C$, $T_M$, $T_Y$ of the color filters CMY is greater than a transmission amount (1300) of light which can be attenuated by the light-attenuating filter 54 (in a case of a region C in FIG. 10), the light is attenuated by the light-attenuating filter 54 to the maximum, and a transmission amount of light which cannot be attenuated by the light-attenuating filter 54 is attenuated by the respective color filters CMY. Further, when the transmission amounts of the color filters CMY obtained by the exposure control algorithm are respectively 100 or less (in a case of a region A in FIG. 10), the transmission amount may be adjusted and controlled by only the color filters CMY without using the light-attenuating filter. 54. In a case of a region B in FIG. 10 (when the transmission amount is ranged from 100 to 1300), the light-attenuating filter 54 and the color filters CMY are both used.

The scan table 58 and the photosensitive material 16 are moved synchronously with the moving of the light-attenuating filter and the color filters CMY. In this way, the image of the film original 59 is successively exposed onto the photosensitive material 16 for each pixel row in accordance with the above-described exposure conditions.

When exposure processing of the image has been completed, the photosensitive material 16 is delivered from the exposure section 22 into the switch back section 40, and the lamp 48 is turned off.

As described above, the target transmission amount $T_O$ of the light-attenuating filter 54 is calculated, by using the exposure control algorithm, from the respective transmission amounts $T_C$, $T_M$, $T_Y$ of the color filters CMY in accordance with the exposure conditions, the respective target transmission amounts $T_{CO}$, $T_{MO}$, $T_{YO}$ of the color filters CMY are calculated from the target transmission amount $T_O$ of the light-attenuating filter 54 and the respective transmission amounts $T_C$, $T_M$, $T_Y$ of the color filters CMY, and the color filters CMY and the light-attenuating filter are moved so that the respective calculated transmission amounts can be obtained. Accordingly, it becomes possible to perform light-adjusting and exposure processing in accordance with the exposure conditions.

Further, the values obtained by subtracting the target transmission amount $T_O$ of the light-adjusting filter 54 from the transmission amounts $T_C$, $T_M$, $T_Y$ of the color filters CMY, respectively, are determined as the target transmission amounts of the color filters CMY, and the color filters CMY are moved so that the determined target transmission amounts are obtained. Accordingly, the respective amounts by which the color filters CMY move can be reduced.

Figure 11:
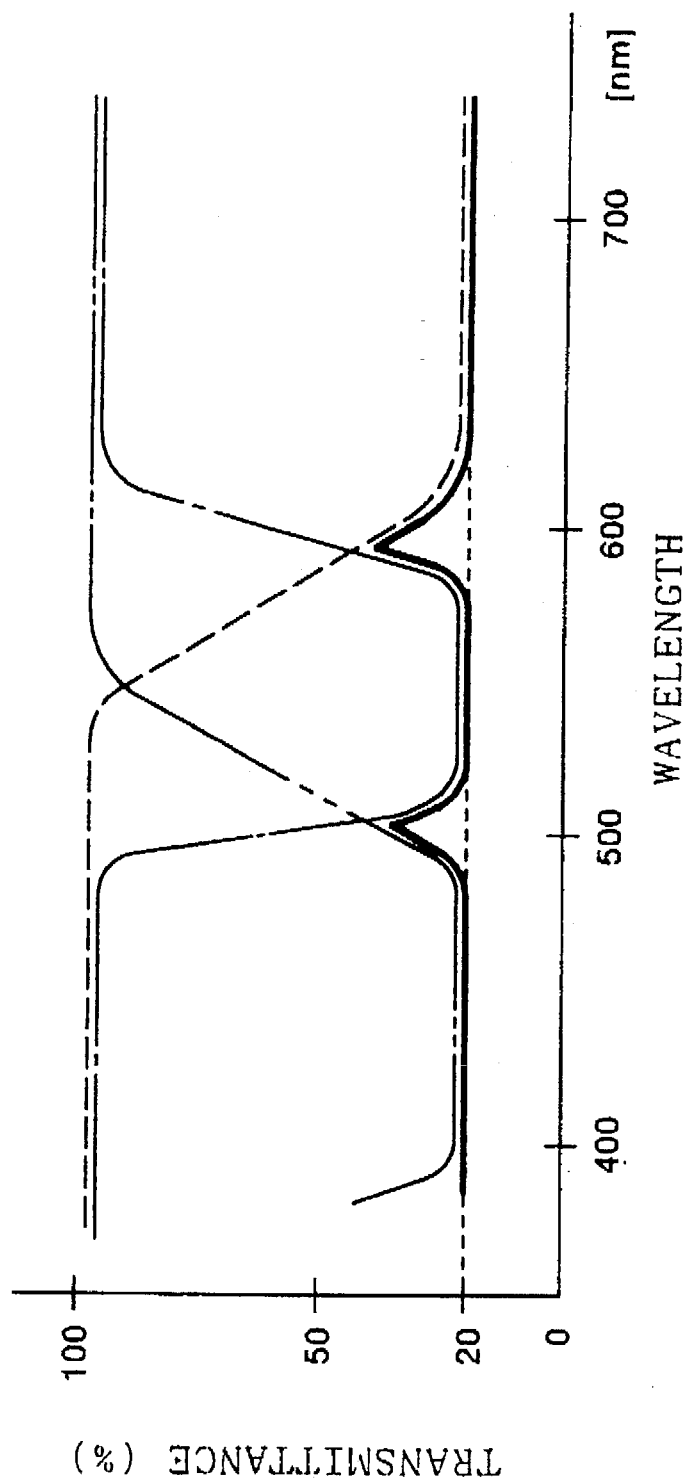
FIG. 11 is a graph showing the relationship between the wavelength and the transmittance when light is attenuated by all of each filter of CMY.
Figure 12:
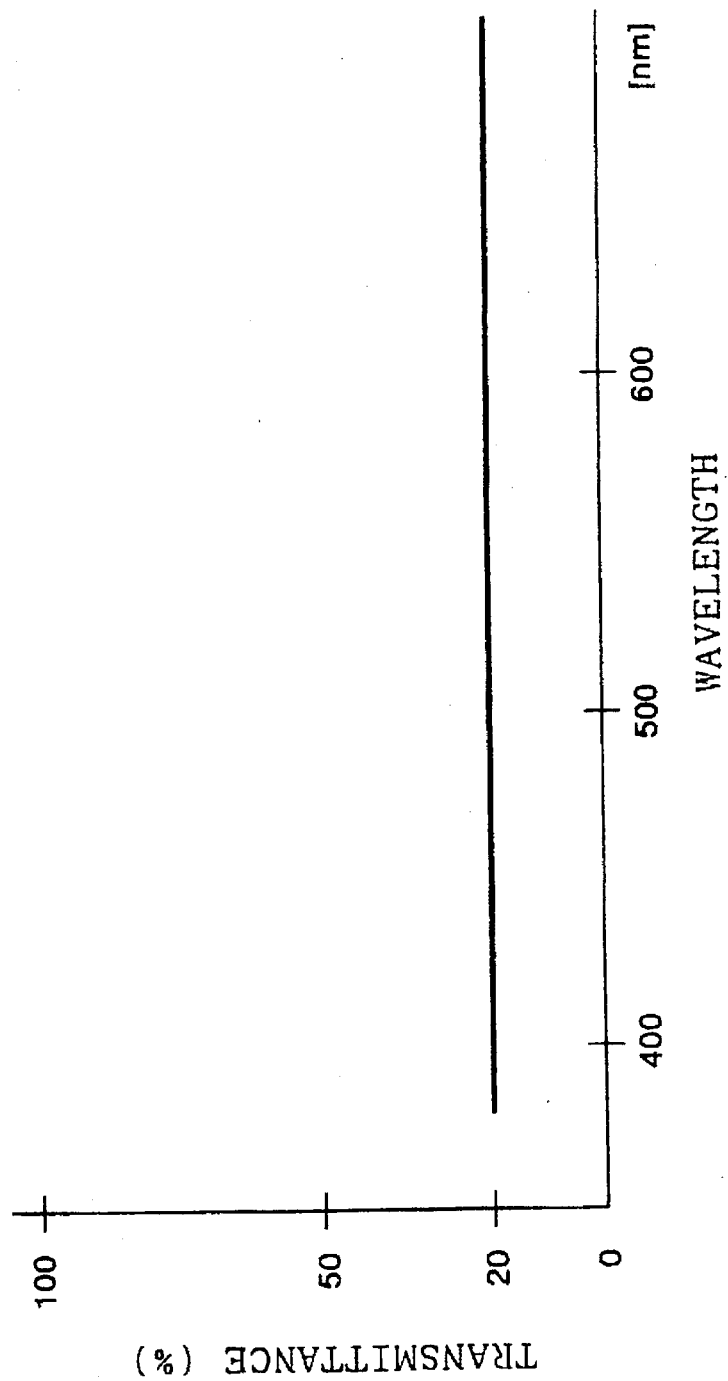
FIG. 12 is a graph showing the relationship between the wavelength and the transmittance when light is attenuated by all of each filter of CMY and the light-attenuating filter.

As illustrated in FIG. 11, in a conventional system, the transmitted light can be attenuated by all of the color filters CMY, but cannot be attenuated to a desired value in a fixed region with the wavelength of 500 nm included and a fixed region with the wavelength of 600 nm included. On the contrary, in this embodiment, the transmitted light is attenuated by the light-attenuating filter in these regions. For this reason, as shown in FIG. 12, the transmitted light can be attenuated to the desired value over the whole wavelength range so that exposure unevenness can be prevented from occurring on the photosensitive material.

The image exposed onto the photosensitive material in the above-described manner is transferred to and formed on the image receiving material 108 as will be described below. Namely, the photosensitive material 16 temporarily delivered into the switch back section 40 is delivered into the water applying section 62 by reverse rotation of the conveying rollers 26. The photosensitive material 16, to which water serving as the solvent for image recording has been applied in the water applying section 62 and excess water has been removed therefrom by the squeeze rollers is sent into the heat developing transfer section 104. Further, synchronously with the above-described exposure of the photosensitive material 16, the image receiving material 108 is pulled out of the image receiving magazine 106 by the nip rollers 110. When the predetermined length of the image receiving material 108 is pulled out, the image receiving material 108 is cut by the cutter 112 to the predetermined length. The cut image receiving material 108 is conveyed by the conveying rollers 190, 186, 114 while being guided by the guide plate 182, and is brought into a waiting state immediately before the heat developing transfer section 104.

When it is detected that the photosensitive material 16 is delivered between the outer periphery of the heat drum 116 and the laminating roller 120 by the squeeze rollers 68, the conveying of the image receiving material 108 starts again in the heat developing transfer section 104. Namely, the image receiving material 108 is delivered into the laminating roller 120, and at the same time, the heat drum 116 is operated.

The photosensitive material 16 and the image receiving material 108, which are superposed by the laminating roller 120, are nipped in a superposed state between the heat drum 116 and the endless press-contact belt 118, and are conveyed over approximately ⅔ of the periphery of the heat drum 116 (between the training roller 134 and the training roller 140). The photosensitive material 16 and the image receiving material 108 are thereby heated. Mobile dyes are released, and at the same time, the dyes are transferred to the dye fixing layer of the image receiving material 108 so that an image is obtained.

When the photosensitive material 16 and the image receiving material 108 reach the lower portion of the heat drum 116, the peeling claw 154 is moved by the cam 180. The peeling claw 154 engages the leading end portion of the photosensitive material 16 which is conveyed so as to precede the image receiving material 108 by a predetermined length, and the leading end portion of the photosensitive material 16 is peeled from the outer periphery of the heat drum 116. Due to the return movement of the peeling claw 154, the pinch roller 157 presses the photosensitive material 16. The photosensitive material 16 is thereby trained around the bending/guiding roller 142 while being pressed by the pinch roller 157, and is moved downward and accumulated in the waste photosensitive material accommodating box 178.

On the other hand, the image receiving material 108, which has been separated from the photosensitive material 16 and which moves while still fit closely to the heat drum 116, is sent to the peeling roller 174 and is peeled. The image receiving material 108, which has been peeled from the outer periphery of the heat drum 116 by the peeling claw 176, is moved downwardly while trained around the peeling roller 174. The image receiving material 108 is conveyed by the receiving material discharge rollers 172, 173, 175 while being guided by the receiving material guides 170, and is discharged into the tray 177. Thus, the operation of the image recording device 10 ends.

Here, a detailed description will be given of the relationship between the amount by which the light-attenuating filter 54 moves and the decrement in the amount of transmitted light of the light-attenuating filter 54.

The light-attenuating filter 54 is moved in the same direction as that in which the scan table 58 moves (i.e., the direction of arrow A). When the light-attenuating filter 54 is moved from the initial position shown in FIG. 13A by a distance K (see FIG. 13B), an illumination range T of light illuminated onto the film original 59, which light corresponds to the slit light and will be hereinafter, referred to as corresponding slit light) reaches the above-described regions 54A1, 54A2, 54A3, . . . . . The corresponding slit light transmitted through the regions 54A1, 54A2, 54A3, . . . is attenuated by these regions. The amount of the corresponding slit light attenuated by the regions 54A1, 54A2, 54A3, . . . corresponds to an area of the corresponding slit light transmitted through the regions 54A1, 54A2, 54A3, . . .

Here, assuming that the amount by which the light-attenuating filter 54 moves is given x, ½ of the apex angle of the isosceles triangle of the region 54A4 is given θ and the width of the slit light is given M, the area S of the corresponding slit light transmitted through the region 54A4 is obtained by the following expression (7):

$$S=(2M\times\tan\theta)\times x+M^2\times\tan\theta \qquad (7)$$

The area Sn of the corresponding slit light transmitted throughout the regions 54A1, 54A2, 54A3, . . . 54An (n sharp-pointed regions are provided) is obtained by the following expression (8):

$$S_n=(2n\times M\times\tan\theta)\times x+n\times M^2\times\tan\theta \qquad (8)$$

The above-described n, M and tan θ are constants, and therefore, the area Sn is a linear function of the amount x by which the light-attenuating filter 54 moves. Thus, the decrement of the amount of the corresponding slit light is a linear function of the amount x by which the light-attenuating filter 54 moves.

Figure 13A:
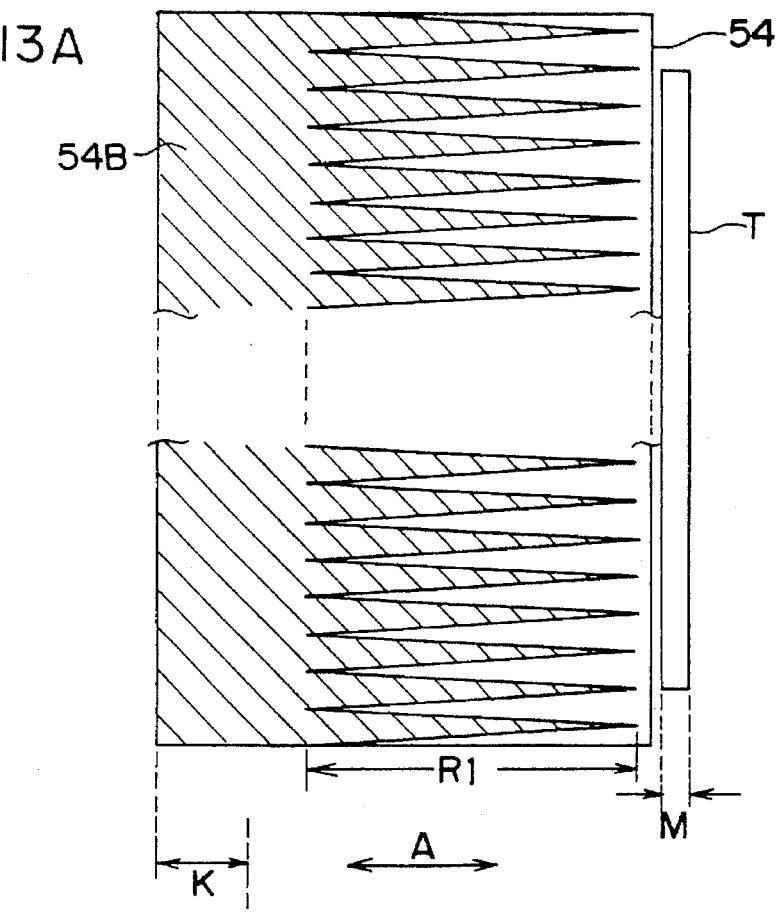
FIG. 13A is a diagram showing an initial position of the light-attenuating filter.
Figure 13B:
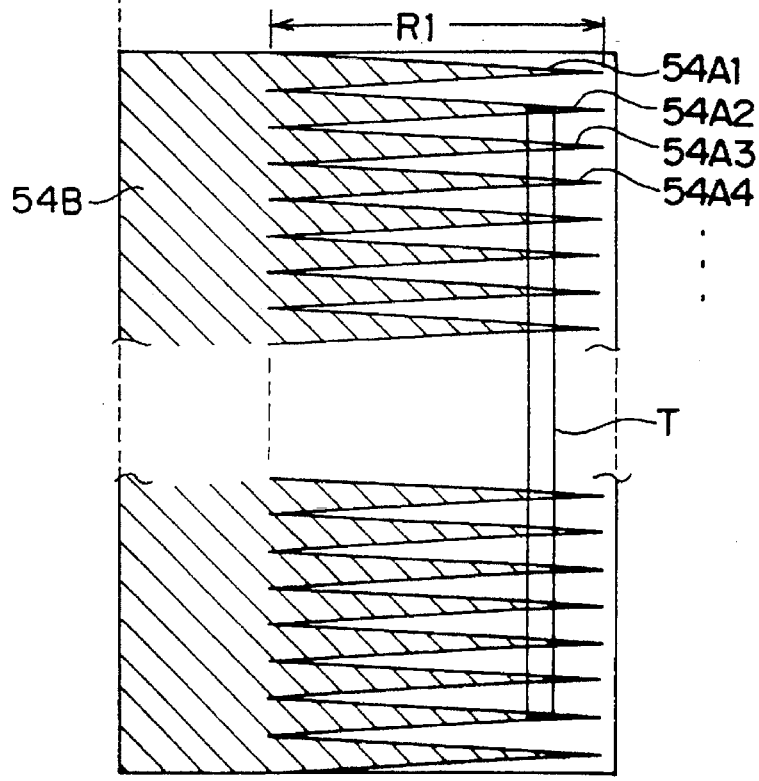
FIG. 13B is a diagram showing the relationship between the position of the light-attenuating filter when moving from the initial position by a distance K and the range in which corresponding slit light is illuminated.
Figure 14:
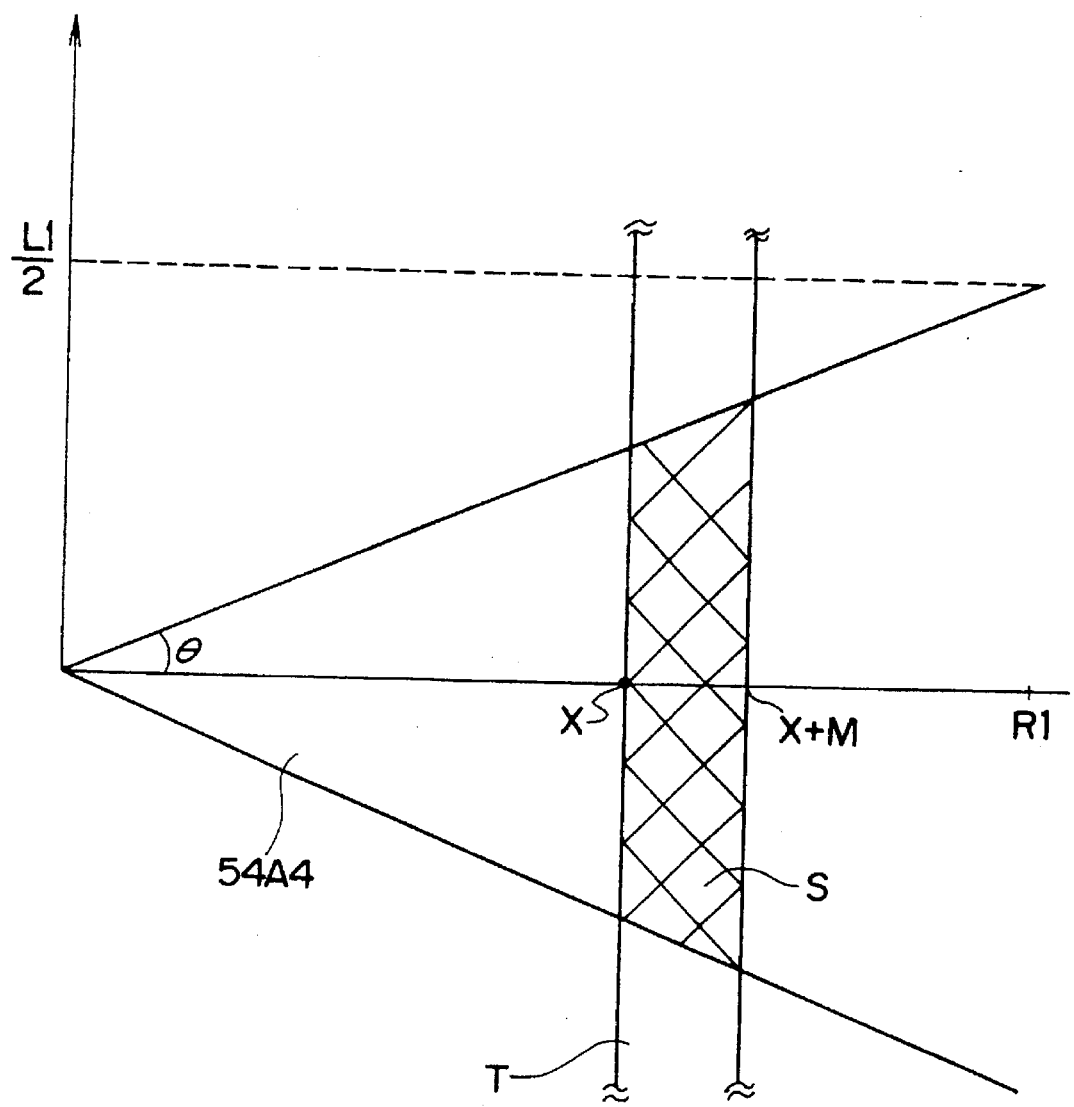
FIG. 14 is an enlarged view of one sharp-pointed portion of the light-attenuating filter.

On the contrary, when the illumination range T of the corresponding slit light, which is shown in FIGS. 13A and 13B is reduced by two shading plates, the area S' in which the slit light is shaded is obtained by the following expression (9), assuming that the amount by which the shading plates move is given x and considering that a longitudinal dimension of the illumination range T of the corresponding silt light is expressed by n×L1 (=n×2R1×tan θ) and that two shading plates are provided.

$$S'=(4n\times R1\times\tan\theta)\times x \qquad (9)$$

In this case as well, it can be understood that the decrement of the amount of the corresponding slit light is a linear function of the amount x by which the shading plates move.

As the expressions (8) and (9) compared with each other, it can be understood that the decrement of the amount of the corresponding slit light with respect to the amount x by which the light-attenuating filter 54 move (in this embodiment) is smaller than that of the amount of the corresponding slit light with respect to the amount x by which two shading plates moves (M<R1).

Here, in a case in which the two shading plates are moved, the illumination range T of the corresponding slit light is made narrower by these two shading plates. For this reason, the amount x by which the shading plates move is smaller than the width M of the illumination range T of the corresponding slit light and the decrement of the amount of the corresponding slit light with respect to the amount x by which the shading plate move is large. Accordingly, it is difficult to obtain an appropriate amount of exposure.

In comparison, this embodiment is constructed in that the light-attenuating filter 54 is moved without the illumination range T of the corresponding silt light being made smaller in width. Accordingly, the amount by which the light-attenuating filter 54 is large and the decrement of the amount of the corresponding slit light with respect to the amount x by which the light-attenuating filter 54 moves is small. For this reason, it is possible to strictly control the decrement of the amount of the corresponding slit light, thereby making it possible to expose the photosensitive material with the appropriate amount of light and to obtain a proper image.

Further, the maximum width L1 of each of the regions 54A1, 54A2, 54A3, . . . is made shorter than the diameter L0 of the circle of confusion formed on the surface of the light-attenuating filter 54 by the zoom lens 72 (see FIG. 6). Accordingly, light transmitted through a region except the regions 54A1, 54A2, 54A3, . . . is diffracted by respective boundaries of the regions 54A1, 54A2, 54A3, . . . and is illuminated on shadow areas of the regions 54A1, 54A2, 54A3, . . . of the light-attenuating filter 54 by which the corresponding slit light is attenuated. For this reason, the shadow areas do not cause the irregularity in illumination and are not reflected in the photosensitive material 16.

Figure 15A:
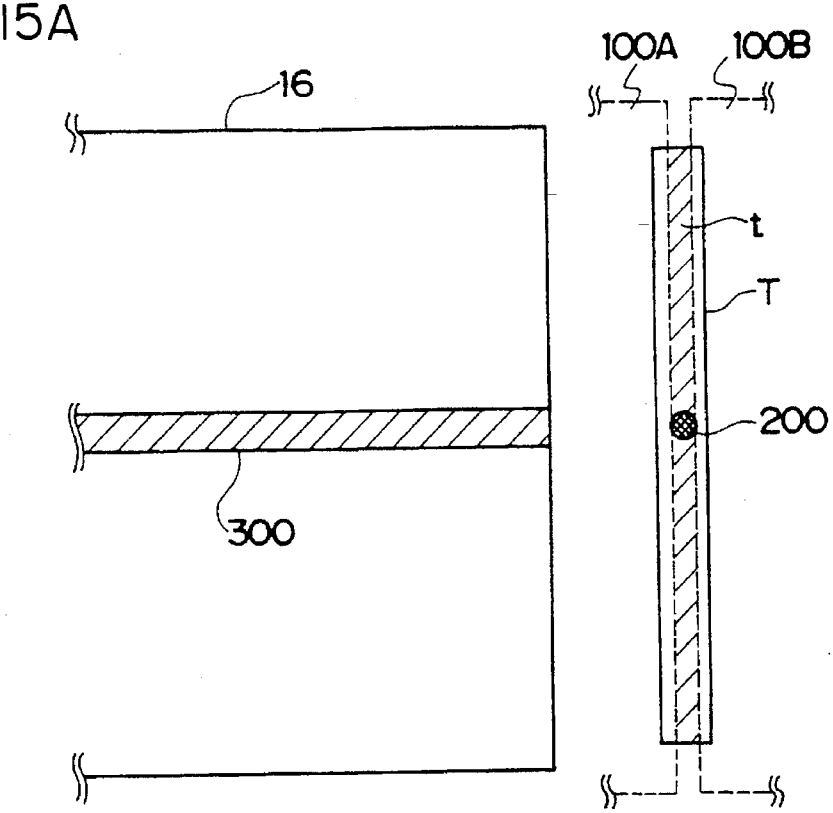
FIG. 15A is a diagram showing a state of irregularity of illuminance on photosensitive material when contaminant is attached to an illumination range of corresponding slit light which is made narrower by two shading plates.
Figure 15B:
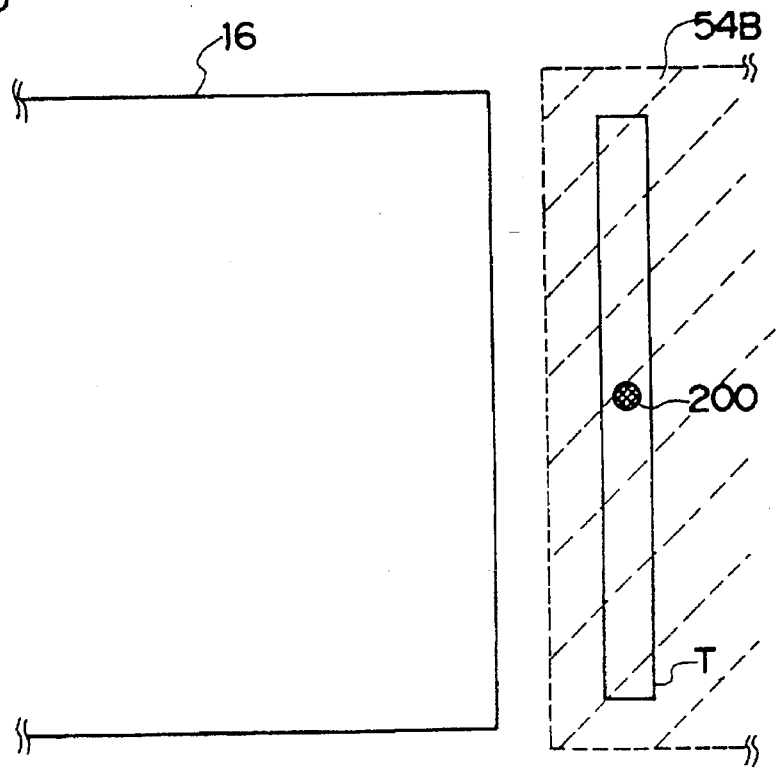
FIG. 15B is a diagram showing a state in which the photosensitive material is exposed when contaminant is attached to the filter in the illumination range of the corresponding slit light.

As illustrated in FIG. 15A, when, by using the shading plates, the film original 59 is illuminated with the minimum amount of light and the photosensitive material 16 is exposed with the minimum amount of exposure, the illumination range T of the corresponding slit light is made narrower by two shading plates 100A, 100B. For example, when contaminant 200 is attached to an illumination range t of the narrow corresponding slit light, the illumination range T of the corresponding slit light is made narrower (the illumination range t). For this reason, a shadow of the contaminant does not become the irregularity in illumination and is reflected in the photosensitive material 16.

In comparison, the present embodiment is constructed in that, when the film original 59 is illuminated with the minimum amount of light, the light-attenuating filter 54 is moved such that the corresponding slit light is transmitted through the region 54B in which the predetermined derivatives are deposited. As a result, the amount of the corresponding slit light is set as the minimum amount of light and the illumination range T of the corresponding slit light is widely maintained. For this reason, light from a region except the region of the light-attenuating filter 54 where the contaminant is attached is diffracted and is illuminated onto a shadow portion of the contaminant 200 on the photosensitive material 16. Accordingly, it is no possibility that the shadow of the contaminant become the irregularity in illumination and be reflected in the photosensitive material 16.

In the present embodiment, the light-attenuating filter 54 is formed in which the predetermined derivatives are deposited in the regions S4A1, 54A2, 54A3, .... and 54B such that the transmittance of the corresponding slit light becomes fixed. Accordingly, in comparison with a case in which, in place of the shading plates, a filter is manufactured in which the predetermined derivatives are deposited on the whole surface of a transparent flat plate which is provided such that the amount of transmitted light successively decreases from one end to the other end of the plate, the light-attenuating filter can be manufactured at low cost. As a result, the image recording device can also be manufactured at low cost.

Figure 16:
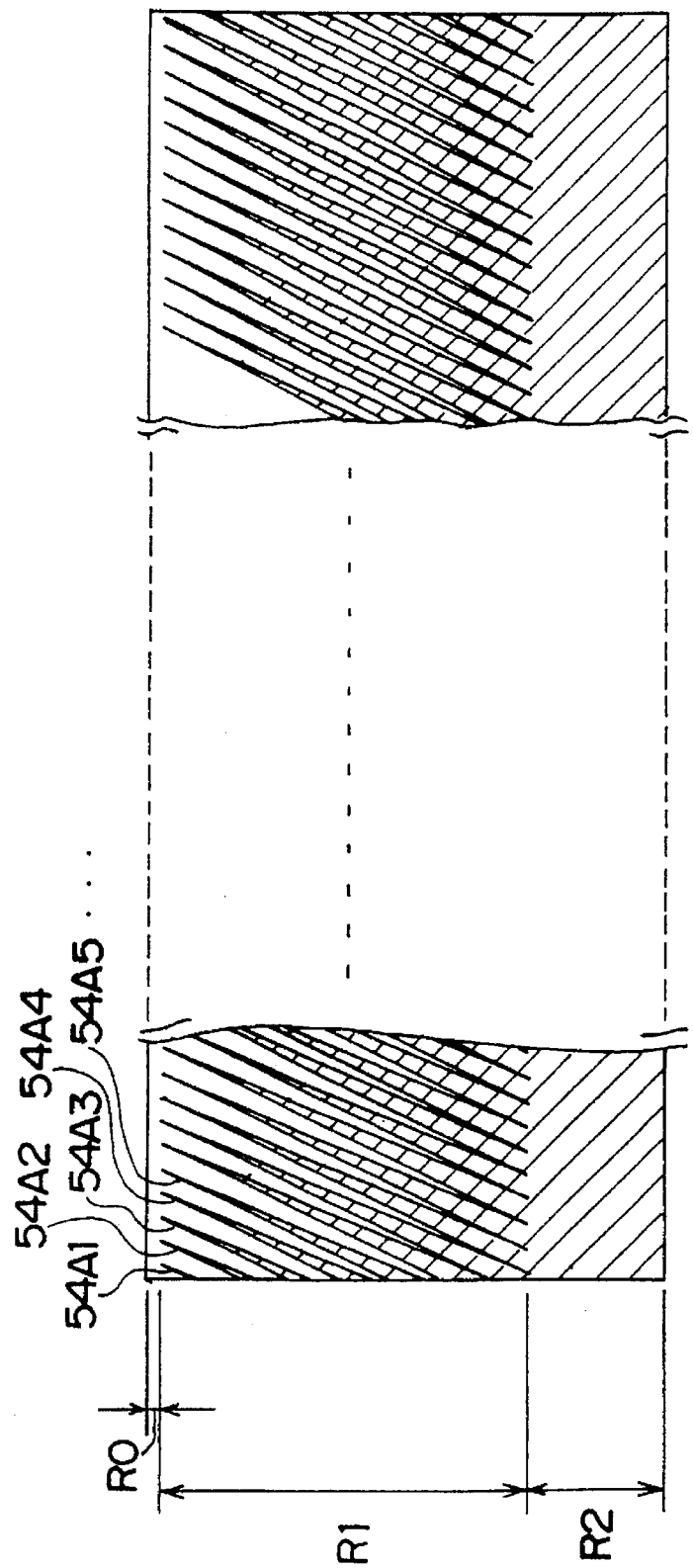
FIG. 16 is a schematic view of the light-attenuating filter with sharp-pointed portions extending obliquely.

The above-described light-attenuating filter is formed such that each sharp-pointed portion which is a light-attenuating region formed in an isosceles triangle extends in the direction in which the filter advances onto and withdraws from the optical axis, but is not limited to the same. For example, as illustrated in FIG. 16, the sharp-pointed portions 54A1, 54A2, 54A3, 54A4, . . . which are the light-attenuating regions, each being formed in the triangle may be respectively formed to extend in a direction at a predetermined oblique angle, for example, 30° to 45°, from the direction in which the filter advances onto and withdraws from the optical axis. When the sharp-pointed portions 54A1, 54A2, 54A3, 54A4, . . . are each formed to extend in the direction at 30° to 40° from the direction in which the filter advances onto and withdraws from the optical axis, the respective total amounts of the corresponding slit light in a direction perpendicular to the direction in which the filter advances onto and withdraws from the optical axis, on a line on the film original 59 extending in the direction in which the filter advances and withdraws can be contained within a predetermined range. As a result, the difference in the amounts of light illuminated onto the film original 59 between the respective positions of the sharp-pointed portions disposed along a direction crossing the direction in which the filter advances and withdraws can be kept within the tolerance range and the irregularity in illumination onto the film original 59 can also be kept within the tolerance range. Thus, a proper image can be obtained.

Figure 17A:
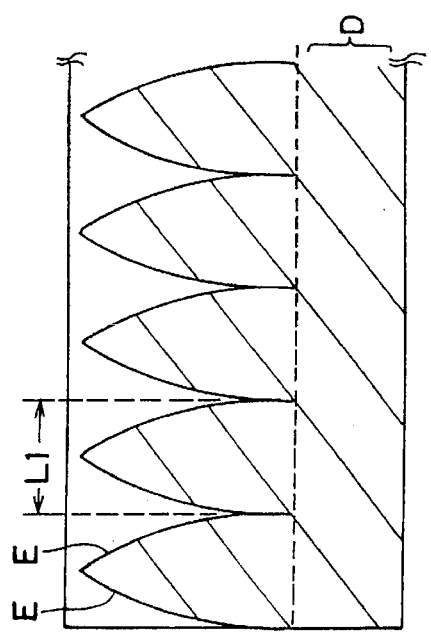
FIG. 17A is a schematic diagram showing a modified example of the light-attenuating filter.
Figure 17B:
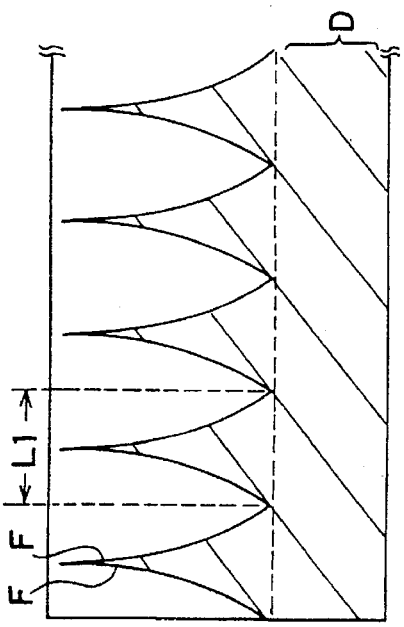
FIG. 17B is a schematic diagram showing another modified example of the light-attenuating filter.

Further, the above-described sharp-pointed portions 54A1, 54A2, 54A3, 54A4, . . . (see FIG. 6 and FIG. 16) of the light-attenuating filter are each formed by two straight-line sides, but the present invention is not limited to the same. For example, as shown in FIGS. 17A and 17B, equilateral sides may be formed of a convex curve line E or a concave curve line F. Further, as shown in FIG. 17D, the widthwise dimension of each of the sharp-pointed portions may be made larger in an indexed manner. Meanwhile, the decrement of the amount of the corresponding slit light with respect to the amount by which the filter moves, in the sharp-pointed portion having the convex curve line E shown in FIG. 17A is larger than that in the sharp-pointed portion having the concave curve line F shown in FIG. 17B. In this case, it suffices that the density of the derivatives deposited on the sharp-pointed portion of the convex curve line E is adjusted to become smaller than that of the derivatives deposited on the sharp-pointed portion of the concave curve line F. In these examples shown in FIGS. 17A, 17B, 17C, the light-attenuating regions on the filter are gradually made larger in the direction in which the filter advances onto and withdraws from the optical axis. Accordingly, it is possible to lessen the rate of change in the decrement of the light illuminated onto the film original 59 with respect to a unit amount by which the filter moves. As a result, since the decrement of the light illuminated onto the film original 59 can be strictly controlled, the photosensitive material can be exposed with an appropriate amount of exposure and a proper image can be obtained.

Further, when the maximum width L1 of the sharp-pointed portion is made smaller than the diameter L0 or the circle of confusion formed on the filter surface by the zoom lens, the shadow of the sharp-pointed portion due to light illuminated onto the film original 59 does not become the irregularity in illumination and is not reflected in the photosensitive material. In addition, when the filter is moved such that the corresponding slit light is transmitted through the region D in which the predetermined derivatives are deposited on the whole surface of the illumination range of the corresponding slit light, even if the amount of transmitted light is set as the minimum amount of light, the contaminant is attached to the illumination range of the corresponding slit light on the filter and the shadow of the contaminant does not become the irregularity in illumination and is not reflected in the photosensitive material. Further, since the light-attenuating filter 54 is formed such that the predetermined derivatives are each deposited thereon with a fixed transmittance, the filter can be manufactured at low cost.

Meanwhile, The sharp-pointed portions shown in FIGS. 17A, 17B and 17D are formed to extend in the direction in which the filter advances onto and withdraws from the optical axis, but the present invention is not limited to the same. For example, as illustrated in FIG. 16, the sharp-pointed portions may be formed to extend in a direction at a predetermined angle (for example, 30° to 45°) from the direction in which the filter advances onto and withdraws from the optical axis. As a result, the difference in the amounts of light illuminated onto the film original 59 between the respective positions of the sharp-pointed portions disposed along a direction crossing the direction in which the filter advances and withdraws can be kept within the tolerance range and the irregularity in illumination onto the film original 59 can also be kept within the tolerance range, so that a proper image can be obtained.

Figure 17C:
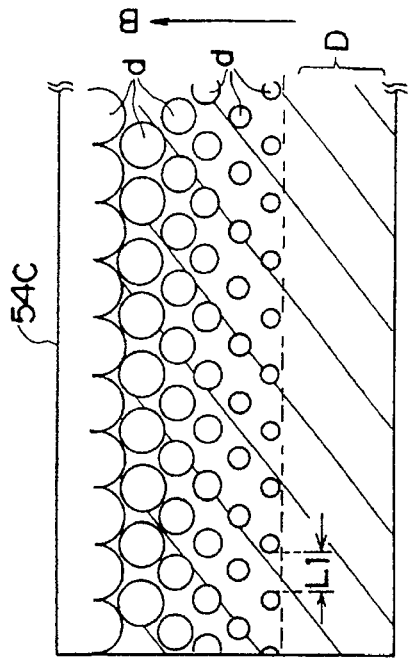
FIG. 17C is a schematic diagram showing a further modified example of the light-attenuating filter.
Figure 17D:
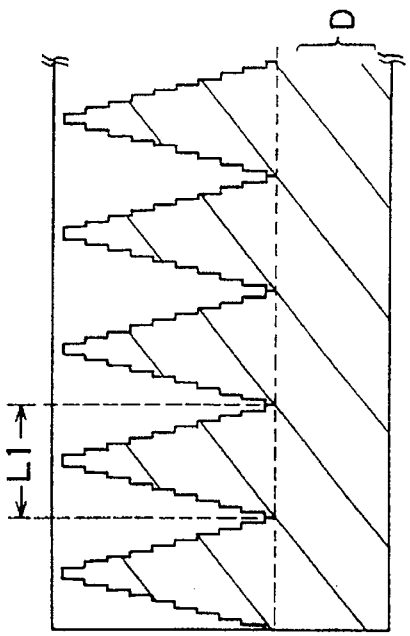
FIG. 17D is a schematic diagram showing a still another modified example of the light-attenuating filter.

Further, as shown in FIG. 17C, the light-attenuating region of the filter may be formed on a light-attenuating plate 54C, in which the derivatives are not deposited in regions (for example, a large number of circular regions d), whose decrement of the amount of transmitted light is smaller than that of the amount of light transmitted through the light-attenuating filter 54C, and the predetermined derivatives are deposited in other regions. It should be noted that, in the example shown in FIG. 17C, the circular regions disposed in the direction in which the filter advances onto the optical axis are formed to increase in diameter (i.e., the direction indicated by arrow B). However, the present invention is not limited to the same, and the circular regions disposed in the direction in which the filter advances onto the optical axis may be formed to decrease in diameter. In this case, it suffices that the density in which the circular regions are disposed in the direction in which the filter advances onto the optical axis is made higher. Further, it may be possible to increase the density in which the circular regions are disposed in the direction in which the filter advances onto the optical axis with no change in the diameter of each of the circular regions. Moreover, a description was given of the example in which the predetermined derivatives are not deposited on the circular regions, but the present invention is not limited to the same. Namely, the predetermined derivatives may be deposited on the whole surface of the transparent flat plate and holes corresponding to the circular regions may be drilled on the flat plate.

In the above-described examples including an example shown in FIG. 17C, the rate of change in the decrement of light illuminated onto the film original 59 with respect to the unit amount by which the filter moves can be made smaller and the decrement of light illuminated onto the film original 59 can be strictly controlled. This results in that the film original 59 can be illuminated with the appropriate amount of light and the photosensitive material can be exposed with the appropriate amount of exposure, so that a suitable image can be obtained. Further, when the maximum length L1 of the distance between the circular regions d is made shorter than the diameter L0 of the circle of confusion formed on the filter surface by the zoom lens, a shadow of the light-attenuating region by the corresponding slit light does not become the irregularity in illumination and cannot be reflected in the photosensitive material. Moreover, when, using the transmitted light of the minimum amount, the filter is moved such that the corresponding slit light is transmitted through a region where the predetermined derivatives are deposited on the whole over and beyond a range corresponding to the illumination range of the corresponding slit light, and even if contaminant is attached to the illumination range of the corresponding slit light on the filter, the shadow of the contaminant does not become the irregularities in illumination and is not reflected in the photosensitive material. Further, since the filter can be manufactured only with the predetermined derivatives deposited with the same degree of density, low cost production can be achieved. Further, by adjusting the respective positions in which the circular regions d are formed, the difference in the amounts of light illuminated onto the film original 59 between the respective positions disposed along a direction crossing the direction in which the filter advances and withdraws can be kept within the tolerance range and the irregularity in illumination onto the film original 59 can also be kept within the tolerance range, so that a proper image can be obtained.

Although the above-described filters are each formed in a flat plate on which the predetermined derivatives are deposited, the present invention is not limited to the same, and a filter having only portion in which the predetermined derivatives are deposited may be used. In this case as well, the above-described effects can be achieved. Further, although the example in which the predetermined derivatives are deposited on a flat plate was described, the present invention is not limited to the same, and a predetermined metal (chromium, silver, aluminum, or the like) may be deposited thereon. In this case as well, the above-described effects can also be achieved.

The photosensitive material 16 of this embodiment is a diffusion transfer-type heat development color photosensitive material formed from a photosensitive element and a image-receiving element, and also has spectral sensitivities to blue, green and red. The wavelengths representing the maximal values of the spectral sensitivities of blue, green and red are approximately 465 nm, 550 nm, 710 nm, respectively. The gradation of a green photosensitive layer at 0.1 [S] exposure is about 2.5 gamma ($\Gamma$) at the density of 1.0 or thereabouts. Further, as the image receiving material 108, a public-known "PICTROSTAT 200/300 SERIES PS PAPER PS-SG" manufactured by FUJI PHOTO FILM CO., LTD. is used.

Meanwhile, as the photosensitive material 16, any one may be used in which a latent image obtained by imagewise exposure is subjected to predetermined development processing so that a visible image can be obtained. For example, a color photosensitive material such as a negative film, reversal film, color printing paper, or the like., a color diffusion transfer-type photosensitive material, a color heat development photosensitive material, or a color photosensitive/pressure-sensitive material may be used. When a positive original is used, a so-called positive-positive-type photosensitive material is used for each of the above-described photosensitive materials, and when a positive image is recorded by using a negative original, a so-called negative-positive-type photosensitive material may be used.

Second Embodiment

Next, a second embodiment of the present invention will be described. In this embodiment, a light-attenuating filter 54A is used in place of the light-attenuating filter 54 of the first embodiment. The light-attenuating filter 54A is used not only to adjust an amount (intensity) of light illuminated onto the film original 59, but also to correct the irregularity In the amount of light (i.e., so-called shading) of the lamp 48. It should be noted that the same members as those of the first embodiment will be denoted by the same reference numerals, and a description thereof will be omitted.

Figure 18:
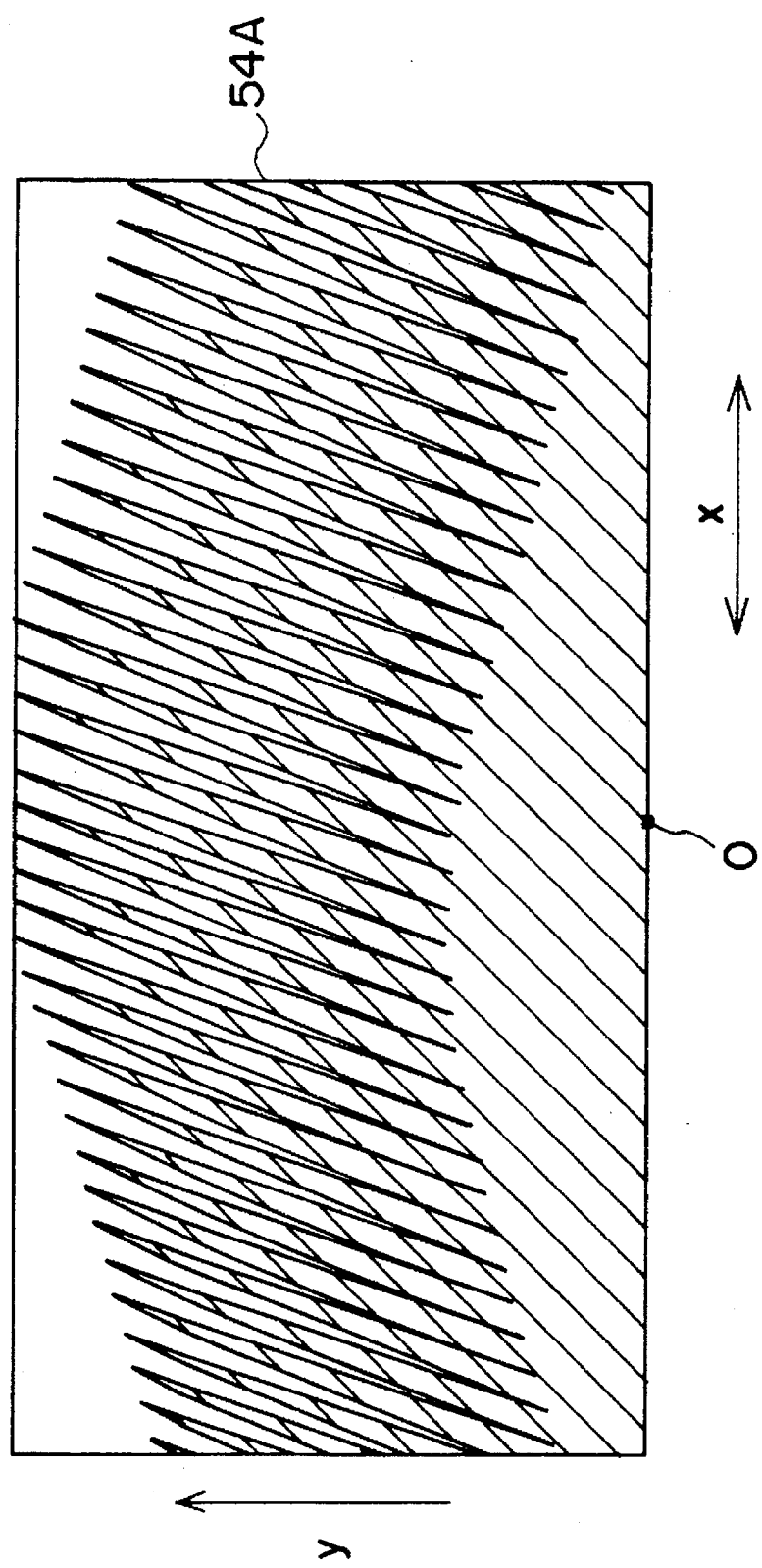
FIG. 18 is a schematic diagram of a light-attenuating filter according to the second embodiment.

In FIG. 18, a plan view of the light-attenuating filter 54A used in this embodiment (when seen from a direction in which light advances) is conceptually illustrated. The light-attenuating filter 54A is formed in that slanted portions are shaded from light and the amount of transmitted light varies in two-dimensional directions. A pattern of light-amount adjustment, i.e., diaphragm, serving as a light-attenuating region, is formed in the direction indicated by arrow y in FIG. 18. A pattern of correction of the irregularity in the amount of light from the lamp 48, serving as a correction region, is formed in the direction Indicated by arrow x, which is perpendicular to the direction of arrow y. The light-attenuating filter 54A is formed in a manner described later. Namely, the diaphragm pattern, in which the amount of transmitted light decreases as the amount by which the light-attenuating filter advances onto the optical path increases, is formed in the direction of arrow y in which the filter advances onto the optical path, i.e., a widthwise direction of the lamp 48 (a widthwise direction of the slit 57 is a scanning direction of the slit light), and the pattern of light-amount adjustment is formed in the direction indicated by arrow x, i.e., the longitudinal direction of the lamp 48, so that the amount of transmitted light at a central portion of the lamp 48 is low and the amount of transmitted light increases toward both ends thereof.

Accordingly, the more a large amount of light is required for exposure, the less the amount by which the light-attenuating filter 54A advances onto the optical path is. When a large amount of light is required, for example, when an overexposed negative film or the like is used as the film original 59, the light-attenuating filter 54A (i.e., a portion thereof at which the amount of light is reduced) is adapted to withdraw from the optical path.

In the slit scanning/exposure device using the rod-shaped light source, in order to effect image recording (reading) with high image quality without forming uneven density, it is necessary to make correction of the irregularity in the amount of light for causing the amount of light to become uniform with the amount of light at the central portion of the light source being reduced. However, the correction of the irregularity in the amount of light basically causes reduction in the amount of light. Accordingly, in the case in which the large amount of light is required for exposure processing, it is necessary to improve the amount of light of the lamp 48.

Further, in a general scanning/exposure device, various sizes of originals, for example, those ranged from 35 mm-size film to a Brownie film are used. For this reason, it is necessary to use the lamp 48 whose length corresponds to an original of the maximum size, i.e., the Brownie-size original. However, as clearly seen from FIG. 19, the longer the rod-shaped light source is, the more the irregularity in the amount of light is. Accordingly, it is necessary to substantially reduce the amount of light at the central portion of the light source, and in a case of a small-sized original, excess loss of the amount of light is resultingly generated. Moreover, as will be described later, the large amount of light is mainly required for the 35 mm-size negative film which uses the central portion of the light source. Accordingly, a large reduction in the amount of light at the central portion results in serious loss.

On the contrary, in the film scanning mechanism 34 of this embodiment, at the time of a normal exposure operation, by adjusting the amount by which the light-attenuating filter 54A advances onto the optical path, the amount of exposure is adjusted and the irregularity in the amount of light is also suitably corrected, so that a high-quality image can be recorded. In addition, when the amount by which the light-attenuating filter 54A advances onto the optical path is reduced to improve the amount of exposure, the amount by which the filter advances onto the optical path is reduced at the same time in the diaphragm pattern and the pattern of correction of irregularity in the amount of light. Accordingly, there also gets fewer a possibility of the reduction in the amount of light due to the correction of the irregularity in the amount of light. When the maximum amount of light is required, the light-attenuating filter 54A (a portion thereof at which the amount of light is reduced) is adapted to withdraw from the optical path. For this reason, even when the large amount of light is required, it is possible to prevent reduction in the amount of light due to the correction of irregularity in the amount of light, which was not prevented by a conventional device. Accordingly, it is possible to utilize the amount of light from the lamp 48 to the maximum. Further, even when a film original in which the large amount of light is required is used, for example, when an overexposed 35 mm-size negative film is used as the film original 59, suitable image exposure can be effected.

Meanwhile, when exposure processing is effected with the maximum amount of light in this embodiment, image recording is effected with no correction of irregularity in the amount of light. However, this does not practically cause any problem for reasons which will be described later.

As described above, the film scanning mechanism 34 allows image recording by using the film original 59 in the range from a 35 mm-size negative film to the Brownie-size film. Here, as the 35 mm-size negative film, negative films photographed by an unspecified large number of general users are used. For this reason, a negative film in which a photographing condition of an original is not constant and which is overexposed is also used very often as an original. In the case of such an overexposed negative film, the maximum density of the original is about the fifth grade. Accordingly, in order to obtain a proper print image, it is necessary to illuminate the film original 59 with the large amount of light and to obtain transmitted light from the film original 59, of which amount is enough for exposure of the photosensitive material 16. On the other hand, the transmission original, for example, a positive film such as slide or the like, except for the negative films from 35 mm-size to Brownie size, is, in most cases, used for business use or by those having technical knowledge such as an enthusiast. Accordingly, in most cases, the originals are photographed under proper conditions. For this reason, the maximum density of the original is about the second grade. As a result, it is not necessary to effect color/density correction substantially at the time of exposure processing for obtaining print images, and it is possible to obtain a suitable print image with a normal amount of light.

In short, in the film scanning mechanism 34, the light-attenuating filter 54A withdraws from the optical path and the photosensitive material 16 is exposed with the maximum amount of light only when the 35 mm-size negative film having high density due to overexposure or the like is used as the film original 59. In other cases, exposure processing is effected in such a manner that the amount of light is adjusted and the irregularity in the amount of light is corrected by the light-attenuating filter 54A.

FIG. 19 typically shows the irregularity in the amount of light of the rod-shaped light source, in which a vertical axis represents the amount of light and a horizontal axis represents a position on the lamp 48 in the longitudinal direction thereof (i.e., a position of the direction indicated by arrow x in FIG. 18).

As described above, the rod-shaped lamp 48 is constructed in that a central portion thereof has the largest amount of light and the amount of light gradually decreases toward both ends thereof. When the 35 mm-size negative film is used as the film original 59, it suffices that the length of the lamp 48 is 36 mm at the maximum. On the other hand, when the Brownie-size film is used as the film original 59, it is necessary that the lamp 48 is of 60 mm or thereabouts at the maximum length. Accordingly, as the lamp 48 of the film scanning mechanism 34, a lamp having the length of about 60 mm is used. For this reason, when the 35 mm-size negative film is used, exposure processing is performed by using the central portion of the lamp 48 having a large amount of light.

However, the irregularity in the amount of light in this portion is represented as $\Delta L_1$ and is substantially smaller than the irregularity in the amount of light between the central portion and the end portion, $\Delta L_2$. Namely, when the 35 mm-size negative film is used as the film original 59, the irregularity in the amount of light of the lamp 48 is very small and the portion having a large amount of light can be used. Accordingly, only if, at the time when the lamp 48 is designed, a characteristic of the irregularity in the amount of light is set at the minimum which is allowable, this does not practically cause any problem without effecting correction of the irregularity in the amount of light.

Further, when the lamp 48 is used in the range from one end to the other thereof for the film original 59 such as the Brownie-size film, the correction of irregularity in the amount of light is basically effected as described above. A normal correction of irregularity in the amount of light is effected In such a manner that a filter having the amount of transmitted light opposite to the irregularity in the amount of light of the light source advances onto the optical path and the amount of light at the central portion of the light source is reduced so that the amount of light of the light source is made uniform over the whole region thereof so as to be adjusted to the amount of light of each of both end portions. In this case, it is of course possible to increase the amount of light of the lamp 48 so that the lamp 48 corresponds to a high-density 35 mm-size negative film or the like. However, an increase in the total amount of light results in an increase in the amount of light at both end portions of the light source, which are not actually used with a large amount of light. Therefore, this is useless.

On the contrary, according to the exposure device of the present invention, it is possible to adjust the amount of light and to correct the irregularity in the amount of light as necessary. Moreover, it is also possible to increase the amount of light in a vicinity of the center of the lamp 48, which is required for the high-density 35 mm-size negative film, without increasing the amount of peripheral light which becomes useless by reason that the high-density Brownie-size film is not actually used.

A filter pattern of the light-attenuating filter 54A having the diaphragm pattern and the pattern of correction of irregularity In the amount of light is shown by the following expression (10).

$$w(x,y) = W \left\{ \left( \frac{1}{10^{-D}-1} + \cos\left(\frac{\pi y}{2L}\right) \right) \times 10^{-C\exp(-x^2/f)} - \frac{1}{10^{-D}-1} \right\} \quad (10)$$

The filter represented by the above-described expression (10) is a comb-teeth-shaped filter in which a sharp-pointed pattern having a substantially spear-shaped configuration as shown in FIG. 18 is repeatedly formed at a fixed pitch. Further, the expression (10) is used to calculate the width w, which is light-shaded (or the amount of light reduced) at one fixed pitch, at a certain position (x, y) in the longitudinal direction of the lamp 48, i.e., the direction of arrow x, and in the direction in which the light-attenuating filter 54A advances onto the optical path, i.e., the direction of arrow y, assuming that the center of the longitudinal direction of the lamp 48 at the end portion at the downstream side of the direction in which the filter advances onto the optical path is given an original point O (see FIG. 18).

In the expression (10), respective parameters are as follows: w is a width of the pattern at a position (x, y); W is a pattern forming pitch; L is the maximum width from the center of the light-attenuating filter 54A in the direction of arrow x, i.e., a pattern forming length from the original point O in the direction of arrow x in FIG. 18; D is the base density of the light-attenuating filter 54A, i.e., the density of a portion in which light transmittance is the minimum (or a light-shaded portion); C is the maximum amount of the corrected density obtained by the correction of irregularity in the amount of light; and f is the width (region) along the direction of arrow x, which is to be subjected to the correction of irregularity in the amount of light. When any negative film in the range from 35 mm-size to Brownie-size is used as the film original as described in the film scanning mechanism 34, for example, such numerical values that W=0.5 mm, L=27.8 mm, D=2.0, C=0.24, f=300 may be used.

The filter represented by the above-described expression (10) utilizes an error function of x, but the present invention is not limited to the same. Any filter having the similar comb-teeth shape and utilizing cos x represented by the following expression (11) can also be applied.

$$w(x,y) = W \left\{ \left( \frac{1}{10^{-D}-1} + \cos\left(\frac{\pi y}{2L}\right) \right) \times 10^{-C\cos(\pi x/2H)} - \frac{1}{10^{-D}-1} \right\} \quad (11)$$

In the expression (11), H is the maximum height of the pattern in the direction of arrow y (the direction in which the light-attenuating filter 54A advances onto the optical path). Under the above-described conditions, for example, it is possible to use H=35.3 mm or the like. Other parameters are the same as those of the above-described expression (10).

In each of the above-described expressions (10) and (11), a part inside of brackets ("[ ]") indicates the diaphragm pattern in the direction in which the filter advances onto the optical path, in which an envelope connecting respective apexes of the comb teeth corresponds to the pattern of correction of irregularity in the amount of light. It should be noted that the numeral values illustrated in the above-described expressions may be respectively changed properly in accordance with a characteristic of the irregularity in the amount of light of the light source of the device actually used, a size and a kind of the corresponding original, or the like.

The light-attenuating filter 54A is a filter in which a diaphragm function and a function of correction of irregularity in the amount of light are basically integrated with each other. However, when the enlargement ratio of a recorded image is of a very wide range, the amount of correction of the irregularity in the amount of light may vary due to the difference In enlargement ratio. In this case, the diaphragm pattern and the pattern of correction of the irregularity in the amount of light are separately formed. In order to effect correction of the irregularity in the amount of light most suitable for each enlargement ratio, not only the diaphragm pattern, but also the pattern of correction of irregularity in the amount of light, which is usually fixed, are formed in a movable manner so as to freely advance onto the optical path, and the amount by which means of correcting the irregularity in the amount of light advances onto the optical path is adjusted in accordance with the image-recording enlargement ratio. Further, when the large amount of light is required, the diaphragm pattern and the pattern of correction of irregularity in the amount of light may be formed to both withdraw from the optical path. In this case, only if the diaphragm can completely withdraw from the optical path, any of public-known various means of adjusting the amount of light can be used.

The pattern of the filter for correcting the irregularity in the amount of light in this case is represented by the following expression (12):

$$w(x,y) = W \left\{ \left( \frac{1}{10^{-D}-1} + \cos\left(\frac{\pi y}{2L}\right) \right) \times 10^{-C(y)\exp(-x^2/f)} - \frac{1}{10^{-D}-1} \right\} \quad (12)$$

The above-described expression (12) is an application expression of the expression (10). Respective parameters of the expression (12) are the same as those of the expression (10).

Function C (y) is a corrected density function obtained by correction of irregularity in the amount of light in accordance with each enlargement ratio range from high ratio to low ratio. For example, the function represented by the expression (13) can be used.

$$C(y)=c\times(1-y/H\times 0.5) \qquad (13)$$

Function C(y) is used to reduce the correction amount with respect to some fixed value c at the time of low enlargement ratio to a half of the amount at the time of high enlargement ratio.

The correction of irregularity in the amount of light using the light-attenuating filter 54A represented by each of the above-described expressions has a filter pattern, in which a light-shaded raised portion is formed only at the central portion of the lamp 48 in the longitudinal direction thereof as shown in FIG. 18, such that the amount of light at the central portion is reduced. However, the present invention is not limited to the same, and the light-shade raised portion may be formed not only at the central portion, but also at a peripheral portion thereof.

As described above, this embodiment is constructed in that the image of the film original 59 is enlarged by the zoom lens 72 to an enlargement ratio from 200% to 850%, projected on the photosensitive material 16, and exposed onto the photosensitive material 16. However, there is a possibility that, depending upon the characteristic of, the zoom lens, a shape of the irregularity in the amount of light on the photosensitive material 16 may vary substantially due to the enlargement ratio.

In this case, usually, the relationship is formed between an exposure range on the photosensitive material 16 and a width of the required irregularity in the amount of light. Therefore, for example, by providing a plurality of error functions indicated by the expression (10), which are respectively offset from the original point, in accordance with the above-described relationship, the light-shaded raised portion may be formed not only at the central portion of the light-attenuating filter 54, but also at a peripheral portion thereof, so that the filter corresponds to the shape of correction of irregularity in the amount of light in accordance with the image-recording enlargement ratio.

In this embodiment, a detailed description will not be omitted of measurement of the irregularity in the amount of light. However, it would be obviously understood by those skilled in the art that from the description of the first embodiment, the irregularity in the amount of light is measured by an unillustrated sensor or the like and the correction thereof is calculated by the control device 250.

In each of the above-described embodiments, the example was described in which the image forming device of the present invention is applied to the film scanning mechanism 34 for reproducing a small-sized film original such as a negative film. However, the present invention is not limited to the same. For example, the exposure device of the present invention can be suitably applied to the original scanning mechanism 38 of an optical system for reproducing a reflection original or the like, or the above-described original scanning mechanism 38 used when a large-sized film original is reproduced. Further, it can also be applied not only to the above-described direct exposure-type copying machine, but also to an image reading device such as a scanner or the like, or a reading section of a digital copying machine.

In the foregoing, the image forming device and the exposure method of the same according to the present invention was described in detail. However, the present invention is not limited to the above-described embodiments and various modifications and changes may be as a matter of course made without departing from the spirit of the invention.

What is claimed is:

1. An exposure device used by an image recording device or an image reading device, in which a light-receiving element is exposed with at least one of light scanning an original and transmitted through the original and light scanning the original and reflected at the original, comprising:

a light source which illuminates the original;

a light-adjusting filter which adjusts light from said light source in accordance with color of an image recorded on the original;

illumination means which gathers at least one of light from said light source and light adjusted by said light adjusting filter and irradiates the gathered light onto the original;

moving means which causes at least one of said light source, said light-adjusting filter and said illumination means, and the original to move relatively during exposure to effect scanning;

a light-attenuating filter which can move in a direction of the relative movement and has a light-attenuating region of a fixed transmittance, which attenuates light illuminated onto the original, an area of said light attenuating region gradually increasing in the direction of the relative movement;

filter moving means which moves said light-attenuating filter such that an amount of light illuminated onto the original becomes a target amount of light;

an imaging optical system which causes light from the original to be imaged at the image-receiving element; and a slit which changes light imaged at the image-receiving element by said imaging optical system into slit light, said slit being formed in that a longitudinal direction thereof is disposed in a direction crossing the direction of the relative movement.

2. An exposure device according to claim 1, wherein said light-attenuating filter is disposed between said illumination means and the original.

3. An exposure device according to claim 1, wherein said filter moving means moves said light-attenuating filter such that, as the target amount of light increases, an amount by which said light-attenuating filter advances in the direction of the relative movement is reduced, and such that, when the target amount of light is greater than or equal to a predetermined value, said light-attenuating filter withdraws in a direction opposite to that of the relative movement.

4. An exposure device according to claim 1, wherein said light-adjusting filter has a plurality of movable filters for adjusting light from said light source.

5. An exposure device according to claim 4, wherein said filter moving means moves the plurality of filters and said light-attenuating filter such that an amount of the slit light becomes a target amount of light in accordance with color of an image recorded on the original.

6. An exposure device according to claim 5, wherein said filter moving means moves said light-adjusting filter and said light-attenuating filter such that, in a decrement of light from said light source, which is attenuated by said light-adjusting filter in accordance with color of an image recorded on the original, at least a part of a decrement of light which is attenuated by all of the plurality of filters is attenuated by said light-attenuating filter.

7. An exposure device according to claim 5, wherein said illumination means has openings into which the plurality of filters are inserted.

8. An exposure device according to claim 7, wherein said illumination means includes an infrared-ray cutting filter for protecting the original from heat emitted from said light source.

9. An exposure device according to claim 8, wherein said illumination means includes an optical system for changing the light gathered and illuminated onto the original into a substantially parallel light ray.

10. An exposure device according to claim 5, wherein said filter moving means measures an amount of slit light illuminated onto the original, and determines respective amounts by which the plurality of filters and said light-attenuating filter are moved such that, on the basis of the measured value, the amount of slit light becomes a target amount of light in accordance with color of an image recorded on the original, so as to move the plurality of filters and said light-attenuating filter.

11. An exposure device according to claim 10, wherein said filter moving means includes:

a mirror disposed between said slit and said imaging optical system so as to be movable and guiding the slit light in a predetermined direction at the time of photometry;

a sensor for photometrically measuring the slit light guided by said mirror;

an imaging lens for imaging the slit light guided by said mirror on said sensor;

calculation means which calculates respective values of amounts by which the plurality of filters and said light-attenuating filter move such that an amount of the slit light becomes the target amount of light; and driving means which moves the plurality of filters and said light-attenuating filter in accordance with the respective values of the amounts of movement.

12. An exposure device according to claim 1, wherein said light-attenuating filter is formed such that an area of a light-attenuating region of said light-attenuating filter gradually increases in the direction of the relative movement by providing, on a light-attenuating plate of a fixed transmittance, which attenuates light illuminated onto the original, a large number of regions each of which transmittance is greater than that of the light-attenuating plate.

13. An exposure device according to claim 1, wherein said light-attenuating filter has the light-attenuating region which is formed in that a large number of sharp-pointed portions of a fixed transmittance for attenuating light illuminated onto the original are arranged in the direction of the relative movement, the sharp-pointed portions each being formed in that the width thereof in a direction crossing the direction of the relative movement is gradually made larger from the leading end to the base end of the sharp-pointed portion and that the maximum length of the width is made shorter than a diameter of a circle of confusion formed on a surface of said light-attenuating filter by said imaging optical system.

14. An exposure device according to claim 1, wherein said light-attenuating filter has the light-attenuating region which is formed such that respective total amounts of light illuminated onto the original at respective positions in a direction crossing the direction of the relative movement, which the light corresponding to the slit light imaged at the image-receiving element, on respective lines on the original extending in the direction of the relative movement, are contained in a predetermined range.

15. An exposure device according to claim 1, wherein said light-attenuating filter has the light-attenuating region which is formed in that a large number of sharp-pointed portions of a fixed transmittance for attenuating light illuminated onto the original are arranged in the direction of the relative movement, the sharp-pointed portions each being formed in that the width thereof in a direction crossing the direction of the relative movement is gradually made larger from the leading end to the base end of the sharp-pointed portion and that the maximum length of the width is made shorter than a diameter of a circle of confusion formed on a surface of said light-attenuating filter by said imaging optical system, and said light-attenuating filter also has a rectangle-shaped portion which is disposed adjacent to the sharp-pointed portions and of which transmittance is the same as the sharp-pointed portions, the rectangle-shaped portion being provided to attenuate light illuminated onto the original over a region which is larger than an area corresponding to a region in which the slit light is imaged at the image-receiving element.

16. An exposure device according to claim 1, wherein said slit is disposed between the original and said imaging optical system.

17. An exposure device according to claim 1, further comprising:

an ultraviolet-ray cutting filter for protecting the original from ultraviolet rays emitted from said light source.

18. An exposure device according to claim 1, further comprising:

a diffusion glass disposed between said light source and the original so as to reduce irregularity in the amount of light of said light source.

19. An exposure device according to claim 1, wherein the light-attenuating region of said light-attenuating filter is integrally formed with a correction region for correcting irregularity in the amount of light of said light source in a longitudinal direction thereof.

20. An exposure device according to claim 19, wherein said light-attenuating filter is constructed in that the light-attenuating region is formed in the direction of the relative movement and the correction region is formed in a direction crossing the direction of the relative movement.

21. An exposure device according to claim 19, wherein said light source is provided to extend in a direction perpendicular to the direction of the relative movement.

22. An exposure device according to claim 21, wherein said light-attenuating filter is constructed in that a light-attenuating region is formed in a widthwise direction of said light source and a correction region is formed in a longitudinal direction of said light source.

23. An exposure device according to claim 19, wherein the correction region is formed such that an amount of transmitted light at a central portion of said light-attenuating filter in a direction perpendicular to the direction of the relative movement is made low and an amount of transmitted light increases in directions of both ends of said light-attenuating filter in the direction of the relative movement.

24. An exposure device according to claim 19, wherein a pattern of the light-attenuating region and the correction region of said light-attenuating filter is expressed by the following formula:

$$w(x,y) = W \left\{ \left( \frac{1}{10^{-D} - 1} + \cos\left(\frac{\pi y}{2L}\right) \right) \times \right.$$

-continued $$10^{-C\exp(-x^2/h)} - \frac{1}{10^{-D}-1} \Bigg\}$$

where,
- w: width of the pattern at a position (x, y)
- W: pattern pitch
- L: maximum width from the center of the light-attenuating filter
- D: base density of the light-attenuating filter
- C: maximum value of an amount of correction (density) for irregularity in the amount of light
- f: width of correction for irregularity in the amount of light.

25. An exposure device according to claim 1, further comprising:
a light-amount irregularity correcting filter having a correction region for correcting the irregularity in the amount of light of said light source in the longitudinal direction.

26. An exposure device according to claim 25, wherein the correction region of said light-amount irregularity correcting filter has a pattern expressed by the following formula:

$$w(x,y) = W \Bigg\{ \left( \frac{1}{10^{-D}-1} + \cos\left(\frac{\pi y}{2L}\right) \right) \times$$

$$10^{-C(y)\exp(-x^2/f)} - \frac{1}{10^{-D}-1} \Bigg\}$$

where,
- w: width of the pattern at a position (x, y)
- W: pattern pitch
- L: maximum width from the center of the light-amount irregularity correcting filter
- D: base density of the light-amount irregularity correcting filter
- C(y): density correction function
- f: width of correction for irregularity in the amount of light.

27. An exposure device according to claim 26, wherein the density correction function is expressed by the following formula:

$$C(y)=c\times(1-y/H\times p)$$

where,
- c: fixed value
- H: maximum length of the pattern in the direction of arrow y
- p: correction coefficient in a ease of a low enlargement ratio of the imaging optical system with respect to that in a case of a high enlargement ratio.

28. An exposure method of an exposure device, the exposure device comprising:
a light source which illuminates an original;
a light-adjusting filter which adjusts light from said light source in accordance with color of an image recorded on the original:
illumination means which gathers at least one of light from said light source and light adjusted by said light-adjusting filter and irradiates the gathered light onto the original;
moving means which causes at least one of said light source, said light-adjusting filter and said illumination means, and the original to move relatively during exposure to effect scanning;
a light-attenuating filter which can move in a direction of the relative movement and has a light-attenuating region of a fixed transmittance, which attenuates light illuminated onto the original, an area of said light attenuating region gradually increasing in the direction of the relative movement;
filter-moving means which moves said light-attenuating filter such that an amount of light illuminated onto the original becomes a target amount of light;
an imaging optical system which causes light from the original to be imaged at the image-receiving element; and
a slit which changes light imaged at the image-receiving element by said imaging optical system into slit light, said slit being formed in that a longitudinal direction thereof is disposed in a direction crossing the direction of the relative movement, said method comprising the steps of:
moving said light-adjusting filter and moving said light-attenuating filter such that an amount of slit light imaged at the image-receiving element becomes a target amount of light in accordance with color of an image recorded on the original.

29. An exposure method according to claim 28, wherein said moving step is provided to move said light-adjusting filter and said light-attenuating filter such that, in a decrement of light from said light source, which is attenuated by said light-adjusting filter in accordance with color of an image recorded on the original, at least a part of a decrement of light which is attenuated by said light-adjusting filter is attenuated by said light-attenuating filter.

30. An exposure method of an exposure device, the exposure device comprising:
a light source which illuminates an original;
a light-adjusting filter which adjusts light from said light source in accordance with color of an image recorded on the original;
illumination means which gathers at least one of light from said light source and light adjusted by said light-adjusting filter and irradiates the gathered light onto the original;
moving means which causes at least one of said light source, said light-adjusting filter and said illumination means, and the original to move relatively;
a light-attenuating filter which can move in a direction of the relative movement and has a light-attenuating region of a fixed transmittance, which attenuates light illuminated onto the original and of which area gradually increases in the direction of the relative movement;
filter-moving means which moves said light-attenuating filter such that an amount of light illuminated onto the original becomes a target amount of light;
an imaging optical system which causes light from the original to be imaged at the image-receiving element; and
a slit which changes light imaged at the image-receiving element by said imaging optical system into slit light, said slit being formed in that a longitudinal direction thereof is disposed in a direction crossing the direction of the relative movement, wherein said light-adjusting filter has a plurality of movable filters for adjusting light from said light source, and wherein said filter moving means moves the plurality of filters and said light-attenuating filter such that an amount of the slit light becomes a target amount of light in accordance with color of an image recorded on the original, said method comprising the steps of:

(A) calculating respective transmission amounts of the plurality of filters;

(B) calculating an amount by which said light-attenuating filter moves on the basis of the respective transmission amounts calculated by said step (A) and moving said light-attenuating filter in accordance with the calculated amount by which said light-attenuating filter moves;

(C) calculating respective amounts by which the plurality of filters move on the basis of the respective transmission amounts calculated by said step (A) and moving the plurality of filters in accordance with the calculated respective amounts by which the filters move; and (D) causing at least one of said light source, said light-adjusting filter and said illumination means, and the original to move relatively at a conveying speed of a value obtained by dividing a conveying speed of the image-receiving element by a latent-image enlargement ratio of said imaging optical system with respect to the original, so as to scan and expose the image-receiving element.

31. An exposure method of an exposure device according to claim 30, wherein said step (C) is effected prior to said step (B).

32. An exposure method of an exposure device according to claim 30, wherein a step of measuring the irregularity in the amount of light of said light source is provided prior to said step (A), and in said step (B), the amount by which said light-attenuating filter moves is calculated so as to correct the measured irregularity in the amount of light, and said light-attenuating filter is moved in accordance with the calculated amount by which said light-attenuating filter moves.

* * * * *